(12) United States Patent
Bakalash

(10) Patent No.: US 8,189,001 B2
(45) Date of Patent: May 29, 2012

(54) METHOD AND APPARATUS FOR PARALLEL RAY-TRACING EMPLOYING MODULAR SPACE DIVISION

(75) Inventor: Reuven Bakalash, Shdema (IL)

(73) Assignee: Adshir Ltd., Shdema (IL)

( * ) Notice: Subject to any disclaimer, the term of this patent is extended or adjusted under 35 U.S.C. 154(b) by 0 days.

(21) Appl. No.: 12/978,493

(22) Filed: Dec. 24, 2010

(65) Prior Publication Data

US 2011/0234583 A1    Sep. 29, 2011

Related U.S. Application Data

(60) Provisional application No. 61/292,152, filed on Jan. 4, 2010, provisional application No. 61/282,241, filed on Jan. 6, 2010, provisional application No. 61/347,380, filed on May 22, 2010, provisional application No. 61/422,100, filed on Dec. 10, 2010.

(51) Int. Cl.
*G06T 15/00* (2006.01)
*G06T 17/00* (2006.01)
*G06T 15/50* (2006.01)
*G06F 15/80* (2006.01)

(52) U.S. Cl. ......... 345/424; 345/419; 345/426; 345/505

(58) Field of Classification Search .................. 345/419, 345/424, 426, 502–505, 541, 544
See application file for complete search history.

(56) References Cited

U.S. PATENT DOCUMENTS

| | | | |
|---|---|---|---|
| 6,933,946 B1 * | 8/2005 | Silva et al. ..................... | 345/582 |
| 7,042,448 B2 * | 5/2006 | Kunimatsu et al. ........... | 345/419 |
| 7,379,067 B2 * | 5/2008 | Deering et al. ................ | 345/506 |

* cited by examiner

*Primary Examiner* — Hau Nguyen
(74) *Attorney, Agent, or Firm* — Nadya Reingand

(57) ABSTRACT

Novel method and system for distributed database ray-tracing is presented, based on modular mapping of scene-data among processors. Its inherent properties include scattering data among processors for improved load balancing, and matching between geographical proximity in the scene with communication proximity between processors. High utilization is enabled by unique mechanism of cache sharing. The resulting improved performance enables deep level of ray tracing for real time applications.

19 Claims, 27 Drawing Sheets

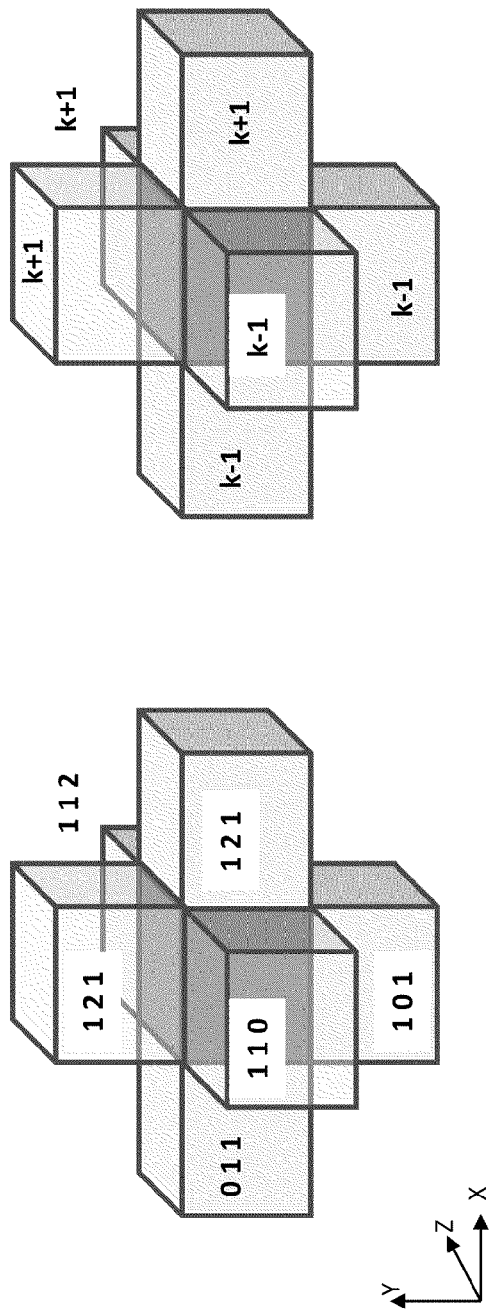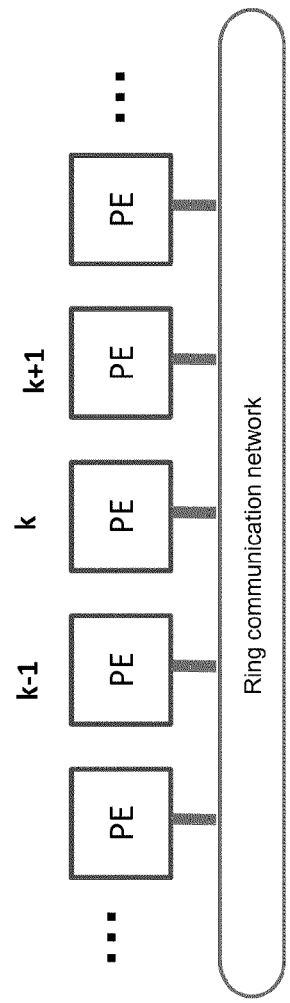
Fig. 3A.
Fig. 3B.
Fig. 3C.

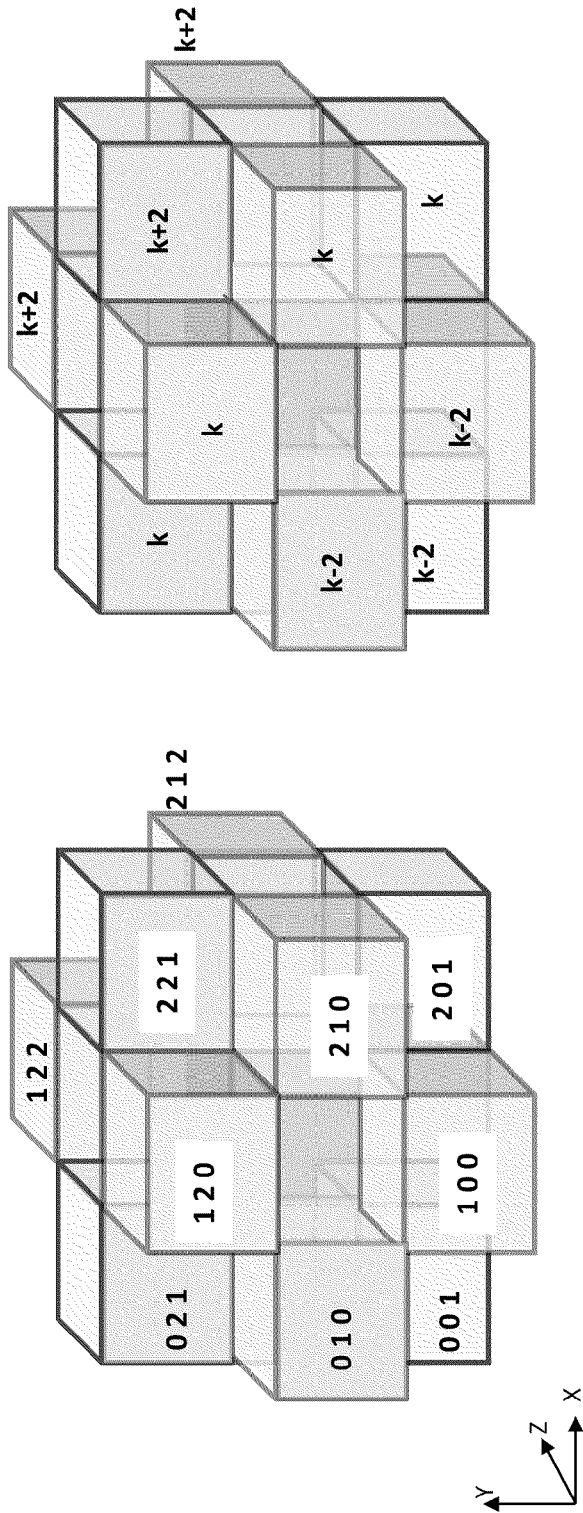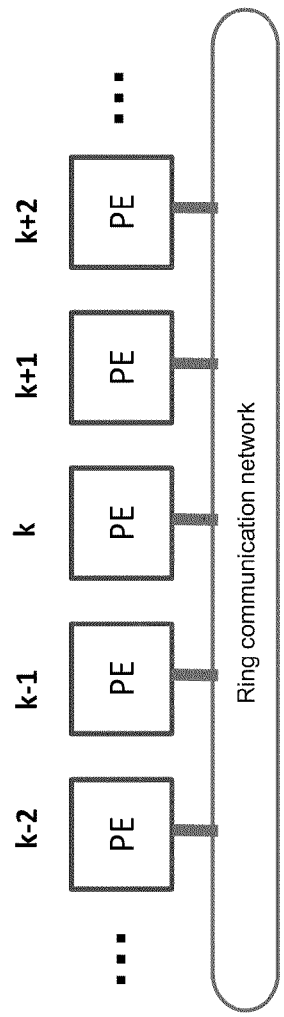
Fig. 4A.
Fig. 4B.
Fig. 4C.

| Instance | Voxel | PE | event |
|---|---|---|---|
| a | 500 | 5 | Pixel gen. |
| b | 642 | 4 | Intersect. |
| c | 652 | 5 | Intersect. |
| d | 542 | 3 | Intersect. |
| e | 742 | 5 | Intersect. |
| f | 372 | 4 | Light src. |

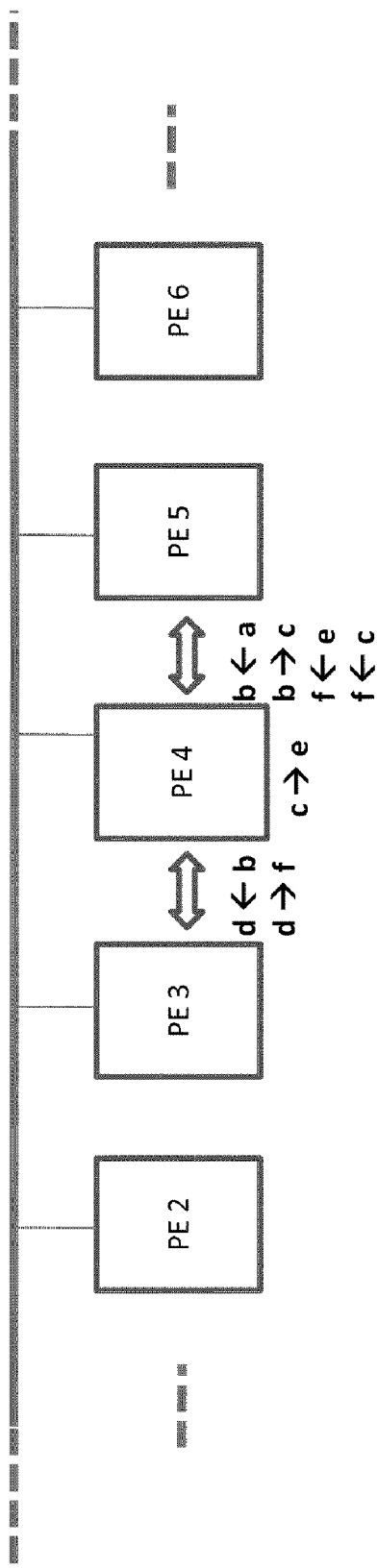
Fig. 7C. Efficient communication of rays by modular mapping.

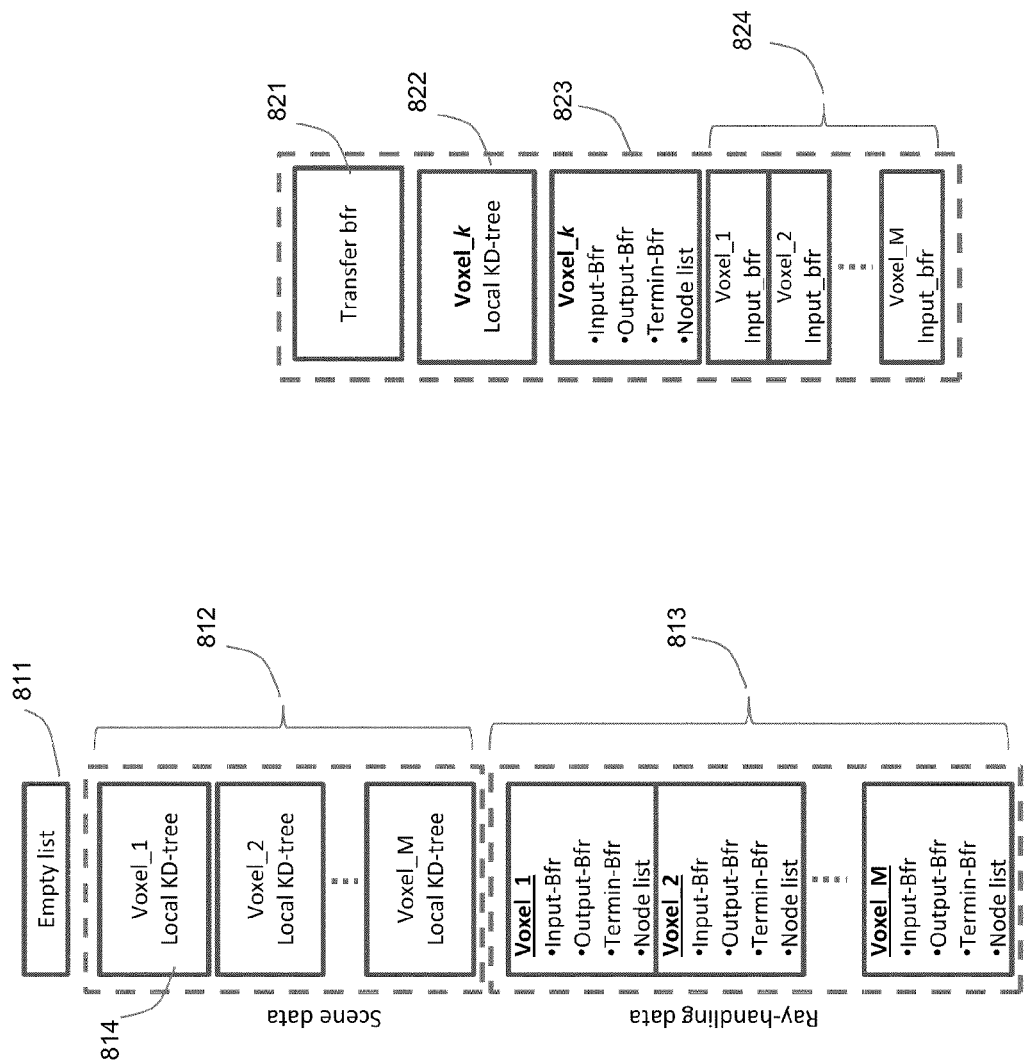
Fig. 8B. Cache resident PE data.
Fig. 8A. Memory resident PE data.

- Input-Buffer
  - Received rays → all the time in cache. *To be processed in Process Ray*
  - Local rays (created by local processing) →
  - Folding rays (back for aggregation) → *to be processed in Folding cycle*
- Output-buffer
  - immediate send (post 3D DDA) → *to be sent to target Voxel*
  - Return to source → *to be returned to the Voxel it came from*
- Termination Buffer
  - Parent rays → *to be aggregated in Folding cycle*
  - Terminated rays → *to be aggregated in Folding cycle*
- Node record
  - local node ID;
  - Pxl_ID_nbr;
  - Topology [parent(source_Voxel_ID), out_ray1 (target_Voxel_ID); out_ray2 (target_Voxel_ID)];
  - Status (build, fold, removed),
  - Light value
- Ray record
  - Pxl_ID_nbr;
  - Source (Voxel_ID; node_ID);
  - regular/shadow;
  - Build/Fold;
  - Ray's normal
  - Light value

Fig. 8C. Ray structure

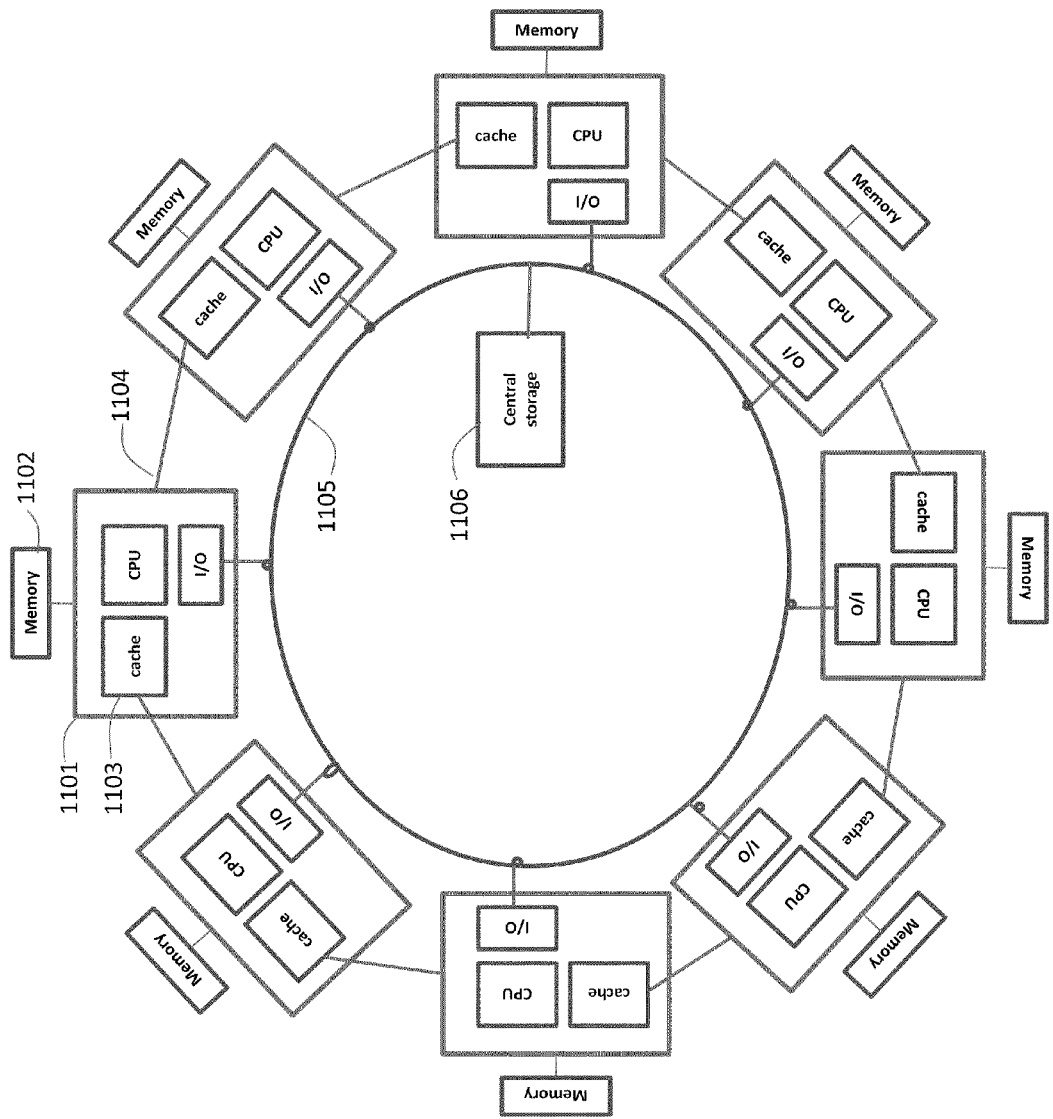
Figure 11A. Distributed memory

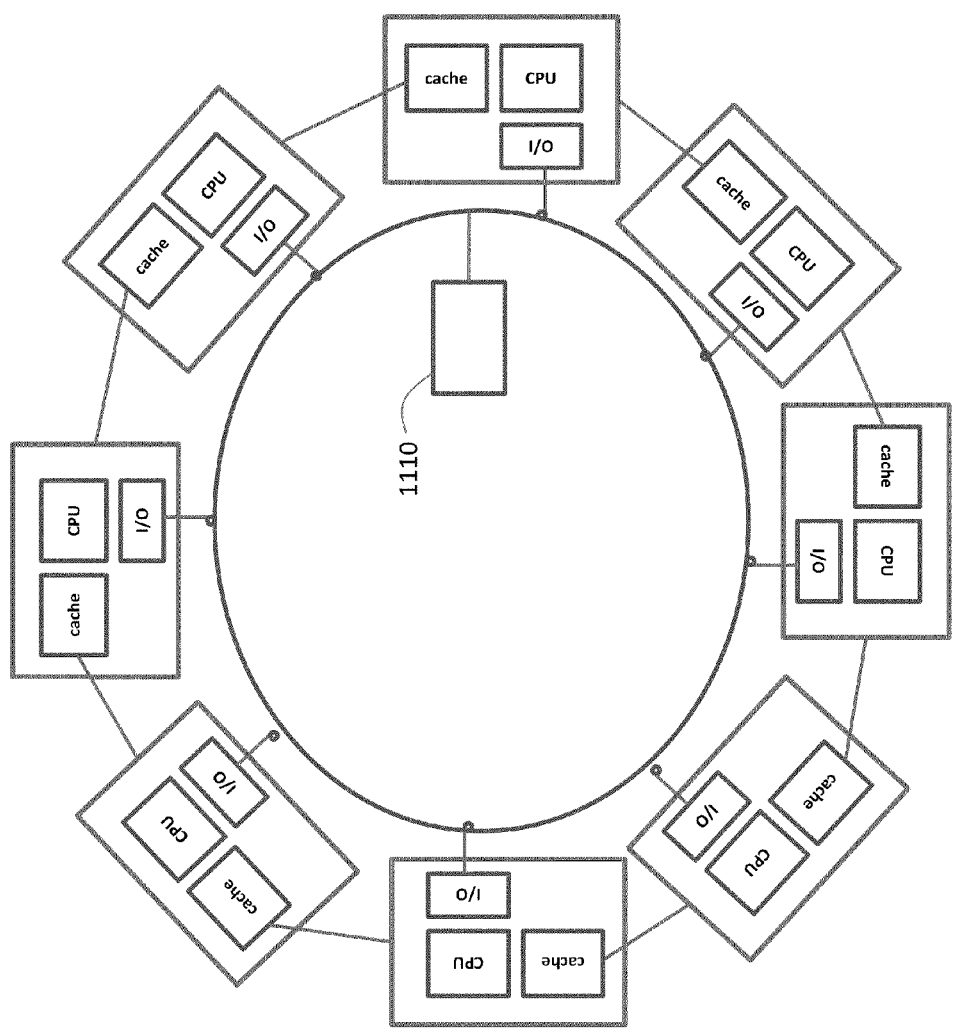
Figure 11B. Shared memory

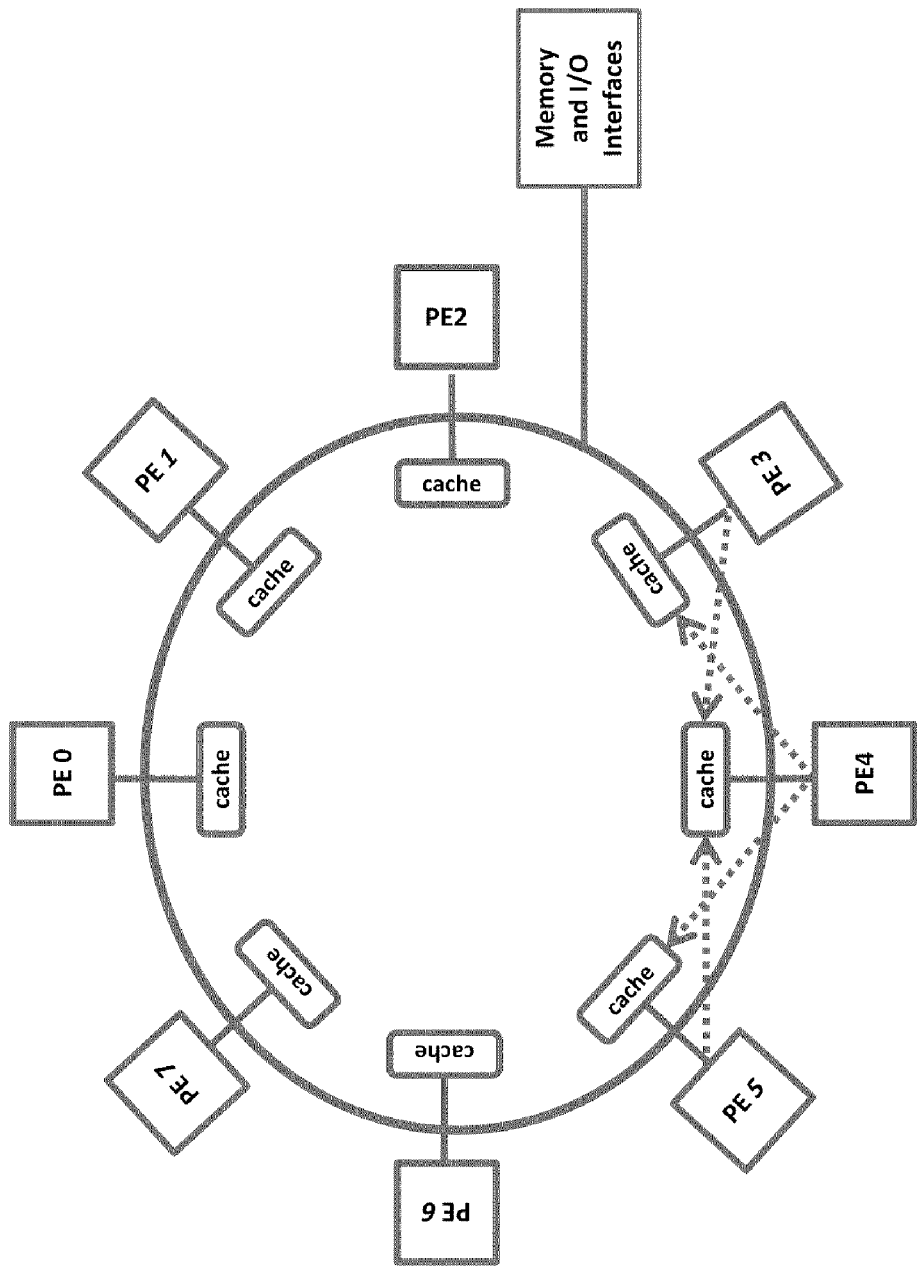
Fig. 12. Use of commodity device; Larrabee multicore by Intel.

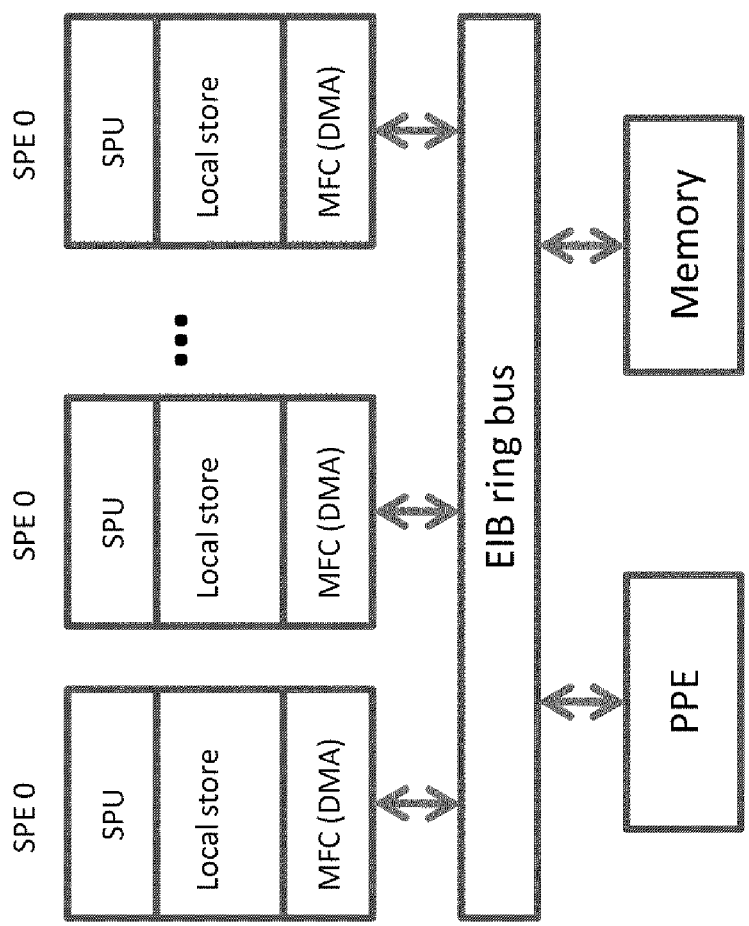
Fig. 13. Use of commodity device; Cell multicore by IBM

METHOD AND APPARATUS FOR PARALLEL RAY-TRACING EMPLOYING MODULAR SPACE DIVISION

CROSS-REFERENCE TO RELATED CASES

The present application claims priority of the U.S. Provisional Application No. 61/292,152 filed Jan. 4, 2010 entitled "Method and Apparatus for Parallel Ray-Tracing Employing Modular Space Division"; U.S. Provisional Application No. 61/282,241 filed Jan. 6, 2010 entitled "Method and Apparatus for Parallel Ray-Tracing Employing Modular Space Division"; U.S. Provisional Application No. 61/347,380 filed May 22, 2010 entitled "Method and Apparatus for Parallel Ray-Tracing Employing Modular Data Structure"; and U.S. Provisional Application No. 61/422,100 filed Dec. 10, 2010 entitled "Method and System for Dynamic Load Balancing of Data Parallel Processing."

FIELD OF THE INVENTION

The present invention relates generally to solving data-parallel processing and, more particularly, to data-parallel ray tracing technology enabling real time applications and highly photo-realistic images.

BACKGROUND OF THE INVENTION

Ray-tracing is a technique for generating images by simulating the behavior of light within a three-dimensional scene by typically tracing light rays from the camera into the scene, as depicted in FIG. 1A. In general two types of rays are used. Primary rays are traced from a particular point on the camera image plane (a pixel) into the scene, until they hit a surface, at a so-called hit or intersection point. Shadow and secondary rays are traced from a hit point to determine how it is lit. Finally, to determine how the surface material appears texture lookups and shading computations are performed at or near the hit point. FIG. 1B shows a scene having three objects and single light source. Three ray generations are created when the primary ray spawns other rays (N' surface normal, R' reflected ray, L' shadow ray, T' transmitted (refracted) ray).

Ray tracing is a high computationally expensive algorithm. Fortunately, ray tracing is quite easy to parallelize. The contribution of each ray to the final image can be computed independently from the other rays. For this reason, there has been a lot of effort put into finding the best parallel decomposition for ray tracing.

There are two main approaches to parallel ray-tracing in prior art: (i) ray-parallel, in which rays are distributed among parallel processors, while each processor traces a ray all the way, and (ii) data-parallel, in which the scene is distributed among multiple processors, while a ray is handled by multiple processors in a row.

The ray-parallel implementation of ray tracing would simply replicate all the data with each processor and subdivide the screen into a number of disjunct regions. Each processor then renders a number of regions using the unaltered sequential version of the ray tracing algorithm, until the whole image is completed. Whenever a processor finishes a region, it asks the master processor for a new task. This is also called the demand driven approach, or an image space subdivision. Load balancing is achieved dynamically by sending new tasks to processors that have just become idle. However, if very large models need to be rendered, the scene data have to be distributed over the memories, because the local memory of each processor is not large enough to hold the entire scene. Then demand driven approach suffers from massive copies and multiplications of geometric data.

Data-parallel is a different approach to rendering scenes that do not fit into a single processor's memory. Here, the object data is distributed over the processors. Each processor owns only a subset of the database and it traces rays only when they pass through its own subspace. Its high data locality excludes massive moves of data, answering the needs of very large models. However, rendering cost per ray and the number of rays passing through each subset of database are likely to vary (e.g. hot spots are caused by viewpoints and light sources), leading to severe load imbalances, a problem which is difficult to solve either with static or dynamic load balancing schemes. Efficiency thus tends to be low in such systems.

In order to exploit locality between data accesses as much as possible, usually some spatial subdivision is used to decide which parts of the scene are stored with which processor. In its simplest form, the data is distributed according to a uniform distribution. Each processor will hold one or more equal sized voxels (volume elements). Having just one voxel per processor allows the data decomposition to be nicely mapped onto a 3D grid topology. However, since the number of objects may vary dramatically from voxel to voxel, the cost of tracing a ray through each of these voxels will vary and therefore this approach may lead to severe load imbalances.

A second, and more difficult problem to address, is the fact that the number of rays passing through each voxel is likely to vary. Certain parts of the scene attract more rays than other parts. This has mainly to do with the view point and the location of the light sources. Both the variations in cost per ray and the number of rays passing through each voxel indicate that having multiple voxels per processor is a good option, as it is likely to balance the workload, albeit at the cost of extra communication.

The way the data is distributed over processors has a strong impact on how well the system performs. The more even the workload associated with a particular data distribution, the less idle time is to be expected. Three main criteria need to be observed for such distributions to lead to efficient execution of the parallel algorithm (Salmon and Goldsmith):

The memory overhead for each processor should be as equal as possible
Communication requirements during rendering need to be minimized
Processing time for each processor needs to be equalized Generating data distributions which adhere to all three criteria is a difficult problem, which currently remains unsolved in prior art. Most data distributions are limited to equalizing the memory overhead for each processor. This is a relatively simple exercise, because generating an adaptive spatial subdivision, such as an octree or KD-tree, gives sufficient clues as to which regions of space contain how many objects.

Another problem in ray tracing is the high processing cost of acceleration structures. For each frame, a rendering system must find the intersection points between many rays and many polygons. The cost of testing each ray against each polygon is prohibitive, so such systems typically use accelerating structures (such as Uniform grid, Octree, KD-tree, other binary trees, bounding boxes, etc.) to reduce the number of ray/polygon intersection tests that must be performed. As the data is sorted over space with the acceleration structure, the data distribution over the processors is based on this structure as well. The spatial subdivision is also used to establish which data needs to be fetched from other processors. Moreover, construction of optimized structures is expensive and does not allow for rebuilding the accelerating structure every frame to support for interactive ray-tracing of large dynamic scenes. The construction times for larger scenes are very high and do not allow dynamic changes.

There has been an attempt in prior art to lower the cost and complexity of acceleration structures by using its simplest form, where the data is distributed uniformly. Each processor will hold one or more equal sized voxels. Having just one voxel per processor allows the data decomposition to be nicely mapped onto a 3D grid topology. However, since the number of objects may vary dramatically from voxel to voxel, the cost of tracing a ray through each of these voxels will vary and therefore this approach leads to severe load imbalances, and consequently the uniform distribution has been abandoned.

Today, the most popular data structure in prior art is the KD-tree. Ray traversal in a KD-tree is less efficient than in uniform grid. However, it is good for the scenes with non-uniform distribution of objects. The massive traversal of accelerating structure based on KD-tree typically consumes major chunk of the frame time (e.g. 63% in average, Venkatraman et al.). Thus, there is a great need in the art to devise a method of improved load balancing leaned on simple acceleration structure, such as uniform grid.

SUMMARY

The present invention is a novel method and system for distributed database ray tracing, based on data-parallel approach and new modular mapping of the scene data into uniform grid. Due to modular distribution of the scene-data among processors the geographical proximity of data elements translates to architectural proximity of processors, allowing task migration between neighboring processors for dynamic load-balancing and efficient neighbor-based data exchange. In preferred embodiment system the ray and scene data transfers are resolved by neighbor-based data exchange using mutual cache-memory access, instead of inter-processor communication, highly improving system's utilization. No global communication is needed.

The method can be implemented as well on commodity architectures, based on off-the-shelf elements, such as multi-core chips, and others. It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

Accordingly, a primary object of the present invention is to provide a new and improved method of and apparatus for practicing data-parallel ray tracing processes in multiprocessing based computer systems, while avoiding the shortcomings and drawbacks associated with prior art apparatus and methodologies.

Another object of the present invention is to provide a new and improved method of and apparatus for practicing data-parallel ray tracing processes having increasing efficiency in very large models.

Another object of the present invention is to provide a new and efficient method of ray tracing leaned on simple acceleration structure, such as uniform grid.

Another object of the present invention is to provide an improved method of ray tracing based on uniform grid acceleration structure, to avoid expensive traversals of complex data structures.

Another object of the present invention is to provide a new method of load balancing in conjunction with simple acceleration structure, such as uniform grid.

Another object of the present invention is to provide modular mapping (MM) of scene data into three-dimensional set of uniform grid of voxels (i.e. voxels), for parallel ray tracing.

Another object of the present invention is to provide modular distribution of scene data for parallel ray tracing, onto three-dimensional uniform grid of voxels (i.e. voxels) according to the method of modular mapping (MM), while the scene can be of any shape used in prior-art ray tracing.

Another object of the present invention is to provide an allocation of voxels of scene data to processing elements (PEs) according to MM skewed alignment, having multiple voxels per processor uniformly scattered across the scene.

Another object of the present invention is to provide an allocation of voxels of scene data to processing elements (PEs) according to MM skewed alignment, having equivalence between geographical neighborhoods of voxels of data with computational neighborhoods of PEs.

Another object of the present invention is to provide an allocation of voxels of scene data to processing elements (PEs) according to MM skewed alignment, such that the shortest geographical distance between voxels is translated into shortest inter-processor distance.

Another object of the present invention is to provide improved architecture for data-parallel ray tracing in the form of a multiple processing elements (PEs) based system, being connected by ring network topology, wherein every two neighboring PEs share a cache memory to accommodate fast ray transfer between neighboring voxels of data, with no need of communication.

Another object of the present invention is to provide such apparatus for practicing data-parallel ray tracing in the form of a multiple processing elements (PEs) based system, being potentially implemented on different commodity multi-core architectures.

Another object of the present invention is to provide apparatus for practicing data-parallel ray tracing in the form of a multiple processing elements (PEs) based system having reduced communication needs due to modular mapped (MM) data structure of scene, avoiding any form of global communication.

Another object of the present invention is to provide apparatus for practicing data-parallel ray tracing in the form of a multiple PEs based system, having minimize massive ray migration among processors due to modular mapped (MM) data structure of scene.

These and other objects of the present invention will become apparent hereinafter and in the claims to invention.

BRIEF DESCRIPTION OF DRAWINGS

The invention is herein described, by way of non-limiting examples only, with reference to the accompanying figures and drawings, wherein like designations denote like elements. Understanding that these drawings only provide information concerning typical embodiments of the invention and are not therefore to be considered limiting in scope:

FIG. 3A shows the neighborhood according to the modular mapping scheme. Voxel 111, belonging to module k=3, is surrounded by 6-connected adjacent voxels.

FIG. 3B shows the neighborhood modular rule of the modular mapping scheme. All the 6-connected neighbors belong to one of the two modules, k−1 (module 2) and k+1 (module 0).

FIG. 3C depicts the computational neighborhood of processing elements assigned to the voxels. The k-th PE assigned to the central voxel has direct access to the data of all its 6-connected surrounding voxels, all residing in the two adjacent memories of k−1 and k+1 PEs.

FIG. 4A shows the second degree of neighborhood according to the modular mapping scheme. Voxel 111, on top of the above 6-connected voxels, is second degree surrounded by 12-connected voxels.

FIG. 4B shows that all second degree 12-connected voxels belong to modules k, k−2 and k+2.

FIG. 4C depicts the associated processors. All the data of 12-connected voxels is stored in the distance of k±2 from the central processor.

FIG. 7C depicts the consequent inter-PEs communication while tracing the ray family. The entire data transfer occurs solely between PE4 and its two neighbors, PE3 and PE5.

FIG. 8A depicts the PE-memory resident data structure associated with each voxel.

FIG. 8B depicts the PE cache resident PE data.

FIG. 8C depicts voxel's data structure.

FIG. 11A depicts the preferred embodiment of present invention comprising a multi-core system on chip (SOC).

FIG. 11B depicts one PE with access mechanism to neighboring PEs and to communication ring.

FIG. 12 depicts an embodiment which is based on commodity device; Larrabee multicore by Intel.

FIG. 13 depicts an embodiment which is based on commodity device; Cell multicore by IBM.

DETAILED DESCRIPTION OF THE PREFERRED EMBODIMENTS

Figure 1A:
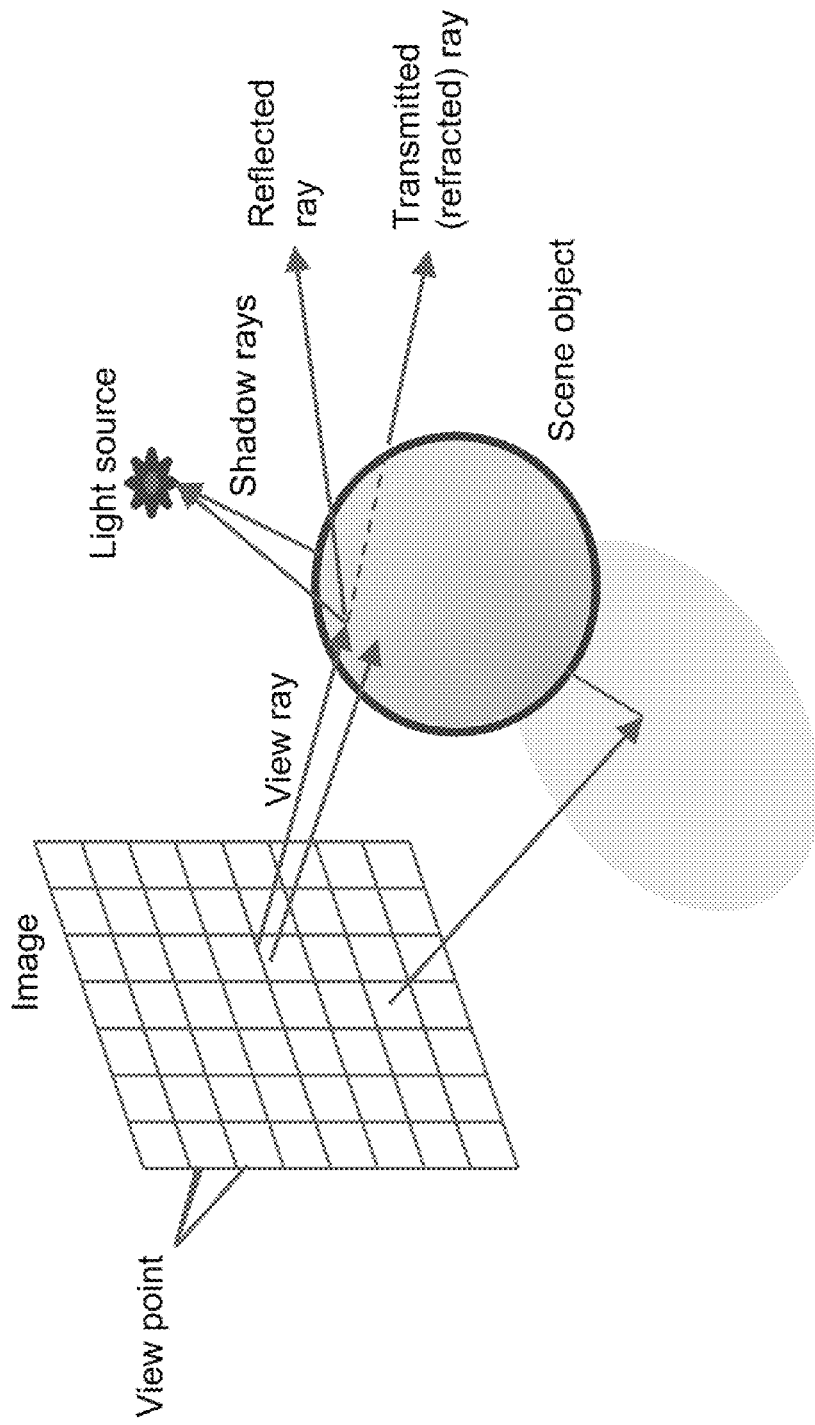
FIG. 1A. Prior art. The figure illustrates a setup of a ray-traced scene including view point, image and scene object. Reflection, refraction, and shadow rays are spawned from a point of intersection between primary ray and scene object.
Figure 1B:
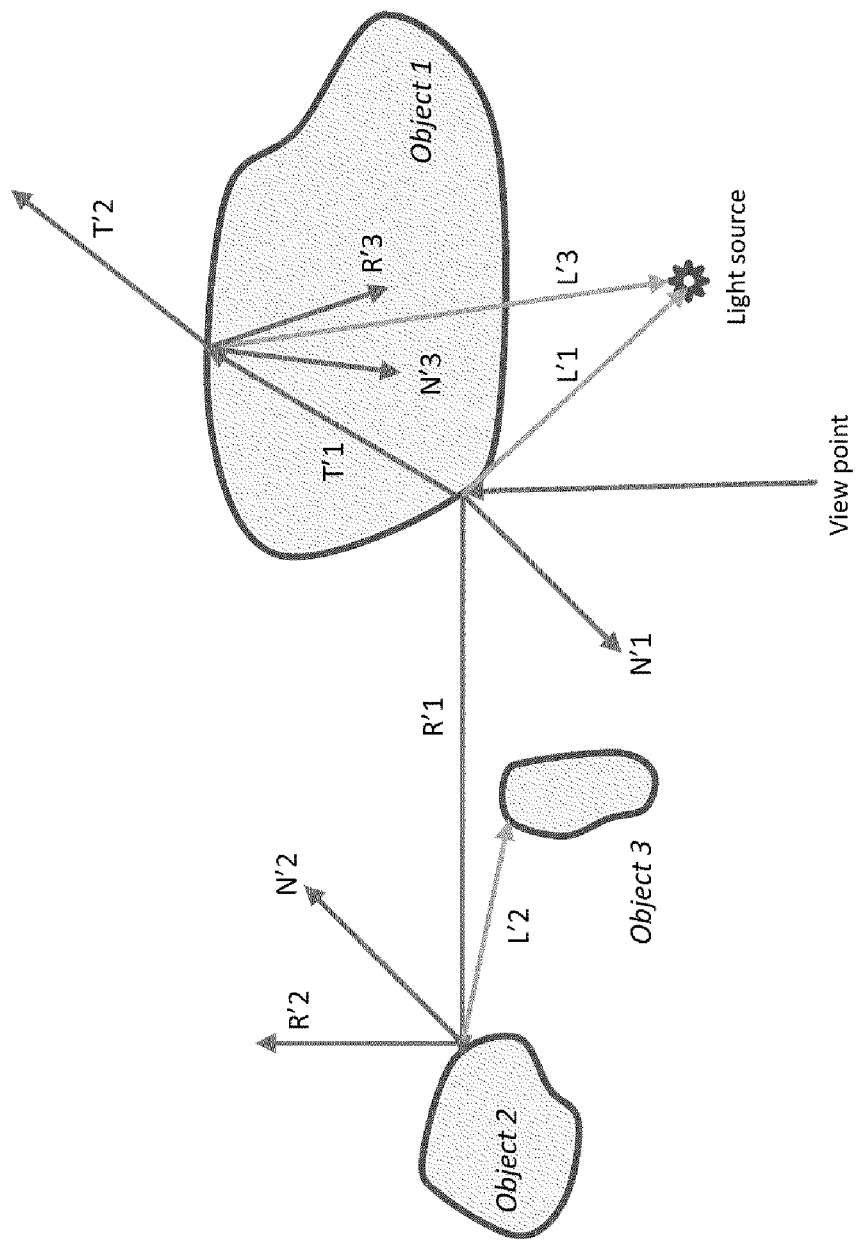
FIG. 1B. Prior art. Another setup of a ray traveling across the scene is shown, having three objects and single light source. Three ray generations are created when the primary ray spawns other rays (N' surface normal, R' reflected ray, L' shadow ray, T' transmitted (refracted) ray).

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Unless specifically stated otherwise, as apparent from the following discussions, it is appreciated that throughout the specification discussions, utilizing terms such as "processing", "computing", "calculating", "determining", "generating", "creating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, cell, voxel, PE, multicore and device (in single or plural form) for performing the operations herein. This may be specially constructed for the desired purposes, or it may contain a general purpose computer selectively activated or reconfigured by a computer program stored in the computer. Such a computer program may be stored in a computer readable storage medium such as, but not limited to, computer memory, cache memory, any type of disk including, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus, unless specifically stated otherwise. Various general purpose or commodity computing systems may be used with programs in accordance with the teachings herein, or it may prove convenient to construct a more specialized apparatus to perform the desired method. The desired structure for a variety of these systems will appear in the description below. In addition, embodiments of the present invention are not described with reference to any particular programming language. It will be appreciated that a variety of programming languages may be used to implement the teachings of the inventions as described herein.

Skewed Modular Mapping

In one aspect of the invention, the space is subdivided into uniform grid of voxels according to Modular Mapping (MM) scheme. In general, any spatial subdivision in parallel ray tracing must have a threefold use; (i) data distribution over processors, (ii) acceleration structure, and (iii) means to know what data to be fetched from other processors. In addition, spatial subdivision must address the load imbalance problem. It will become apparent how the Modular Mapping subdivision of present invention, addresses all those requirements, despite its simplicity and low cost.

We divide the whole scene into Nx, Ny, and Nz intervals along x, y, and z axes, respectively, the three-dimensional scene is partitioned into Nx×Ny×Nz axis-aligned grid cells. To make the analysis of time and space complexity easier, we will assume Nx=Ny=Nz=N. The universal space is then partitioned into axis-parallel N3 cuboidal cells, termed voxels.

The voxels are arranged in N modular sets (or modules), such that each module comprises exactly $N^2$ voxels. N is also the number of processors, in a way that each processor, or cluster of processors, is allocated a module of $N^2$ voxels. Module k-th is the geometric location of all voxels such that:

$$k=(x+y+z)\bmod N$$

Figure 2B:
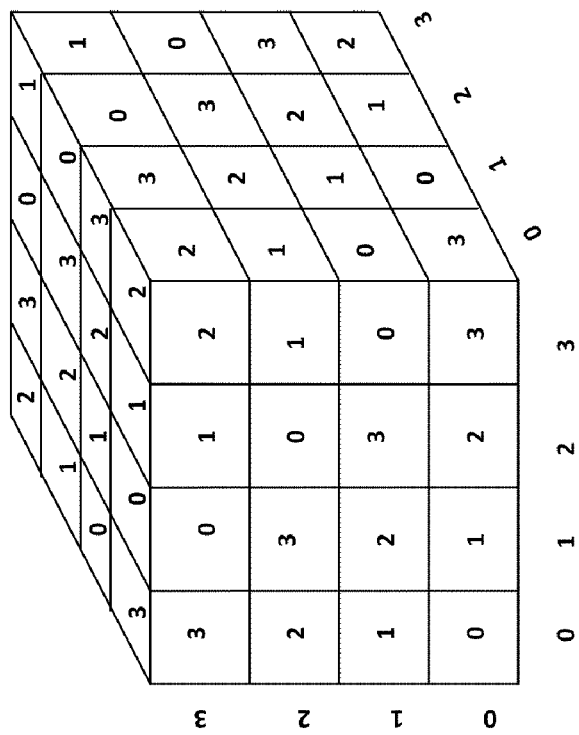
FIG. 2B depicts affiliation of voxel to modules, and alignment of those modules.
Figure 2A:
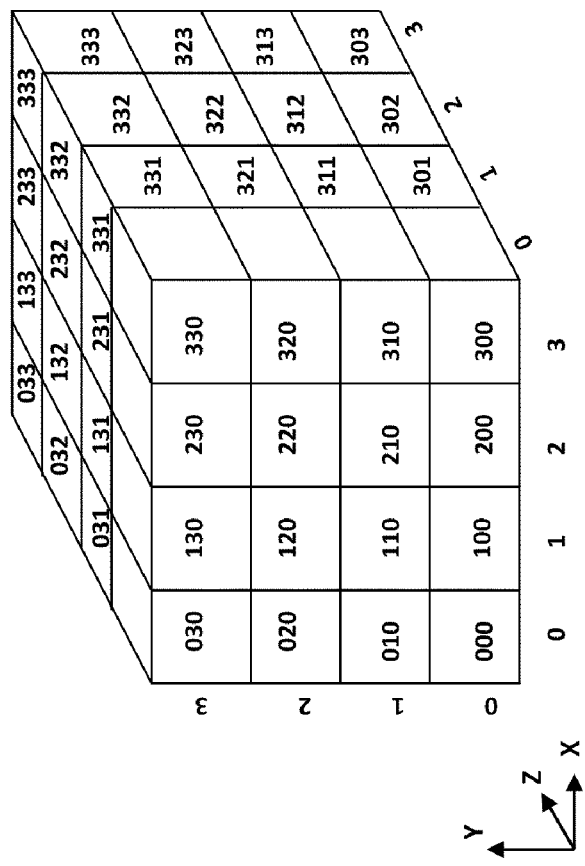
FIG. 2A depicts an exemplary scene universe of N=4 according to the modular mapping scheme. (a) The modular mapping (MM) of scene data into three-dimensional set of 4×4×4 uniform grid of voxels. Enumeration of voxels is shown.

An example is shown in FIG. 2A. A scene universe is divided into 4×4×4 equal voxels. Each voxel is enumerated according to its coordinates X, Y, Z. FIG. 2B depicts the same voxels sorted by their modular affiliation. Notice the skewed alignment of modules. A voxel belongs to the $k_{th}$ module by its location, according to the modular formula:

$$k=(x+y+z)\bmod 4$$

e.g. a voxel at x=2, y=1, z=0 is assigned to module 3.

Data Distribution Over Processors.

All Voxels are distributed over at least N processors, such that each module is dominated by one processor, or cluster of processors. Although for simplicity, the following discussion refers to the case of a single processor per module. In way of example, the table below shows voxel distribution over four processors, for the case of N=4.

| X+Y+Z | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PE | 0 | 1 | 2 | 3 | 0 | 1 | 2 | 3 | 0 | 1 | 2 | 3 | 0 | 1 | 2 | 3 |

Figure 2C:
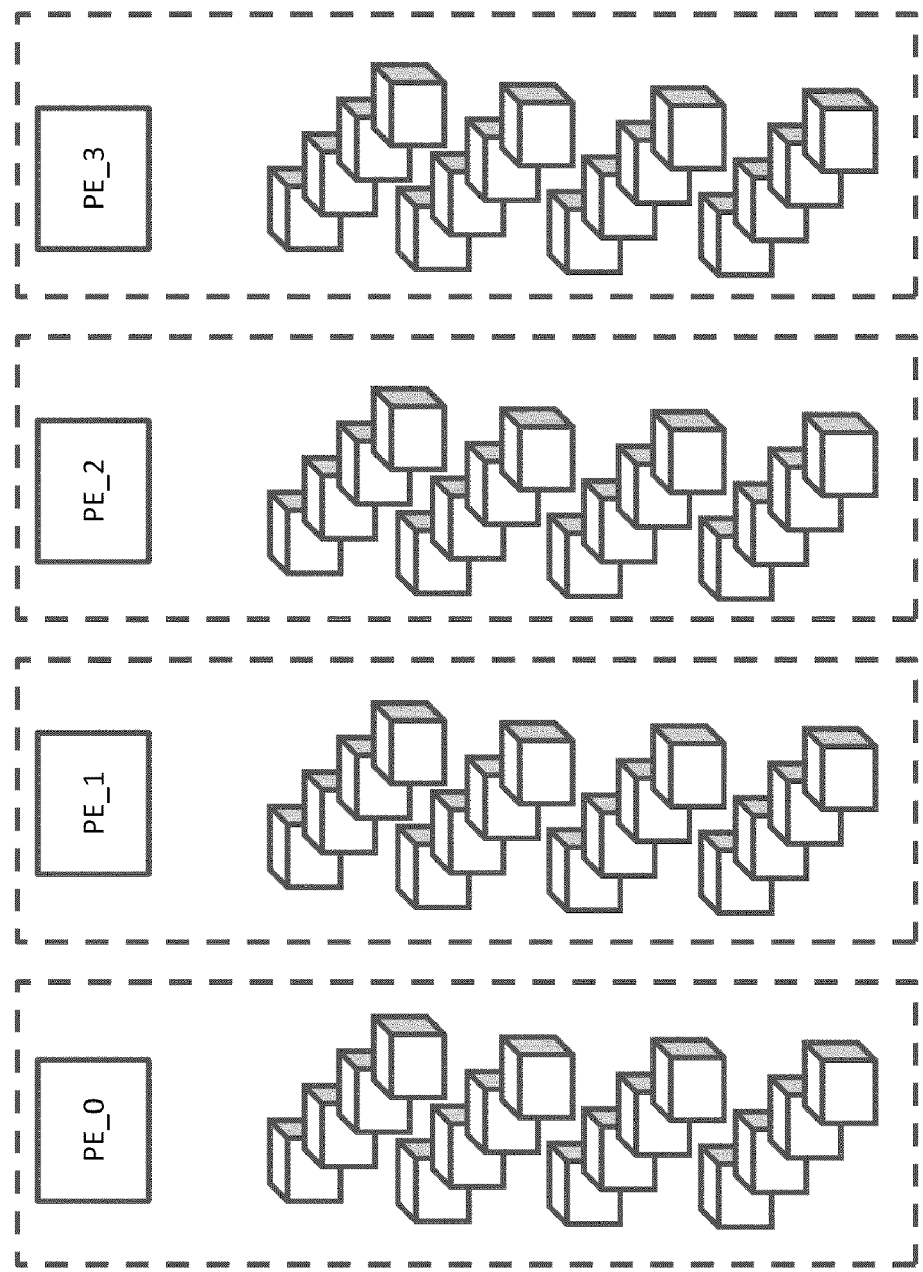
FIG. 2C illustrates that each one of the 4 processors in a given example is assigned a module of 4×4 voxels.

Because of this simply formulated corresponding of data distribution over processors, it is FIG. 2C shows schematically that each PE gets assigned exactly 16 voxels. The scattering pattern of modular voxels is apparent in FIG. 2D. Module k=3 is shown, out of 4 modules. It's fairly uniform distribution across the space is a critical factor for effective load balancing.

In general, acceleration structures assist in locating the voxel sequence along the traced ray looking for the hit point. In complex structures, such as KD-tree or Octree, it is done by traversing the data tree, which is a very expensive process. As opposed to it, ray tracing on the uniform grid of MM, is based on the well known incremental algorithm for line drawing on 3D raster grid (3D DDA). While tracing, the algorithm skips empty voxels by only examining the farthest intersection point of the ray with the next non-empty voxel.

Data Fetched from Other Processors.

In regular course of ray tracing according to present invention, for small data scenes the entire scene can be stored in a shared memory, or for large data scenes it has to be distributed among processors' local memories. In the later case, a processor holding data of required x, y, z site can be easily located by any other processor by simply calculating the k value from the MM formula.

Figure 2D:
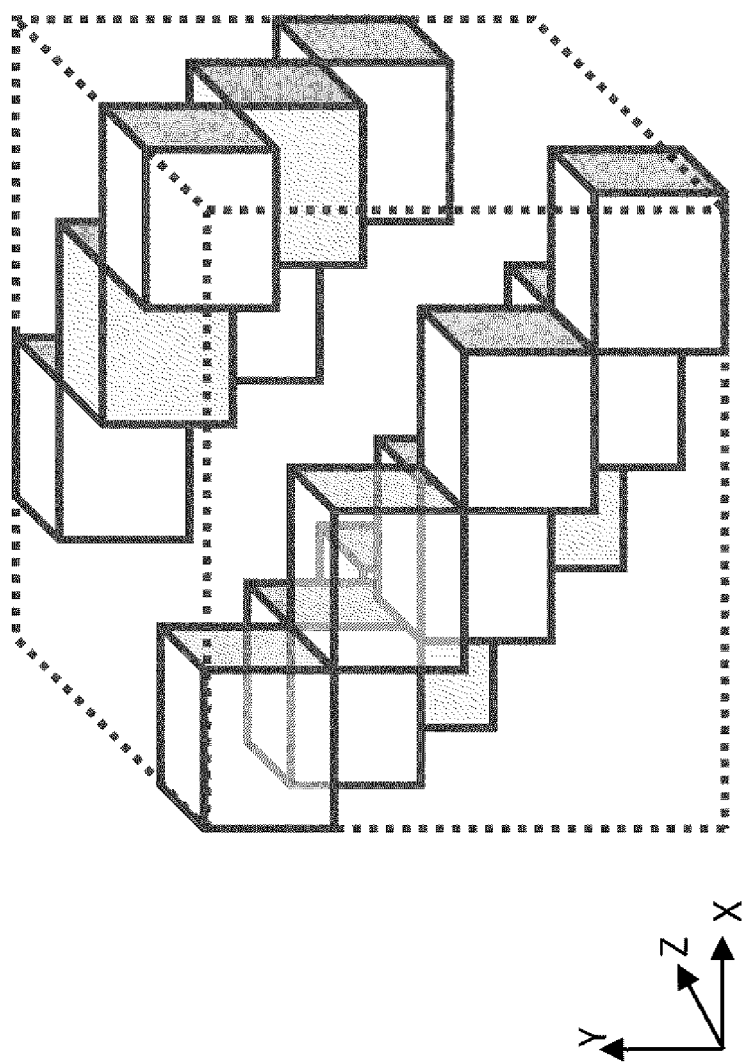
FIG. 2D exemplifies the skewed pattern of the modular set of voxels k=3, scattered over the space.

In one way the Load balancing method of present invention exploits the natural dispersion of modular voxels across the space, as shown in FIG. 2D. This is an intra-modular, or local load balancing. A processor (or cluster of) to which all voxels of a given module are allocated, prioritizes its attention according to voxel's load. Moreover, a processor can handle multiple voxels at a time by multi-threading. The other way is inter-modular load balancing, having a more global effect, carried out by processor "borrowing" mechanism. It is based on the MM feature of correlation between geographical and computational neighborhoods. It is used for offloading an overloaded processor by its closest neighboring processors. This method will become apparent in the following discussion.

Geographical Vs. Computational Neighborhood

Important feature of the Modular Mapping of present invention is the similitude between geographical and computational neighborhood. First, the neighborhood rule of MM must be understood. We are going to analyze two circles of proximity to a voxel; the first degree is of 6 closest wrapping-around voxels, and the second degree counting 18 voxels (including the 6). In FIG. 3A a voxel 1, 1, 1 is shown rounded by its 6-connected geographical neighboring voxels. The way of mapping those voxels onto modules is indicated in FIG. 3B. The central voxel, belonging to module k, is wrapped by voxels assigned to two modules only: k+1 and k−1. Because of the one-to-one mapping of module per processor, the meaning is that central processor $PE_k$ can access all the geographically surrounding data of every one of its modular voxels, merely fetching two processors. And vice versa, the processors $PE_{k-1}$ and $PE_{k+1}$ can access all the data of $PE_k$, not just for the central voxel, but of all its modular voxels. Moreover, in the simplest ring topology, as illustrated in FIG. 3C, the distance is of one hop only. The imperative fact is that the computational proximity matches the geographical one, thus the shortest geographical distance between voxels is translated to the shortest inter-processor communication distance.

The second circle of proximity includes 18-connected voxels. 12 of them, excluding the 6-connected, are shown in FIG. 4A. The way they are mapped onto modules is indicated in FIG. 4B. Two modules have joined the first ones; k−2 and k+2. All the four modules, assigned to processors are shown in FIG. 4C. The central processor $PE_k$ can access all the 18-connected geographical neighbors of any of its voxels from four processors only, and vice versa, the processors $PE_{k-1}$, $PE_{k-2}$, $PE_{k+}1$ and $PE_{k-2}$ can access all the data of $PE_k$, just in one or two ring hops.

It is noteworthy that in ray-tracing, majority of rays entering or leaving a voxel communicate to "next door" voxels, which means a minimal computational distance. As will become apparent, in the preferred embodiment of present invention this minimal computational distance is cheaply hopped by a shared cache-memory access between adjacent PEs.

Inter-Modular Load Balancing

Spatial subdivision suffers from clustering of objects in few regions for most of the scenes. In modular level clustering can be overcome by intra-modular load balancing mechanism. However, for global scale clustering an inter-modular mechanism is vital, such that load distribution between modules can be adjusted. The global clustering is addressed by "borrowing" mechanism, based on the inexpensive data transfer between adjacent PEs. For an overloaded module, part of the load can be taken by an unemployed neighboring PE, which is borrowed to process some voxel subset of the busy neighbor. The data associated with those voxels must be delivered to the borrowed PE. This is readily accomplished by data transfer between adjacent PEs.

Figure 5A:
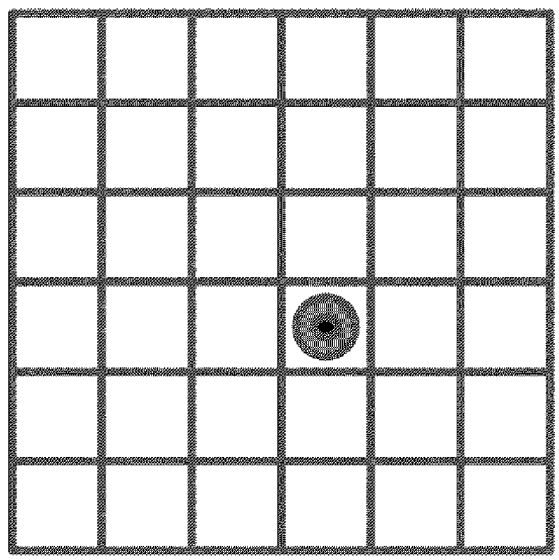
FIG. 5A depicts an extremely imbalanced scene of "Teapot-in-a-stadium." For a traditional uniform grid subdivision the tracing result would be very inefficient.

The borrowing mechanism is demonstrated on a known test case in the art; the "teapot-in-a-stadium" scene. This test scene has a very small object (the teapot) inside a very large empty space (the stadium). If a traditional uniform grid subdivision is used for this scene, the result is very inefficient due to extremely imbalanced load, as shown in FIG. 5A.

Figure 5B:
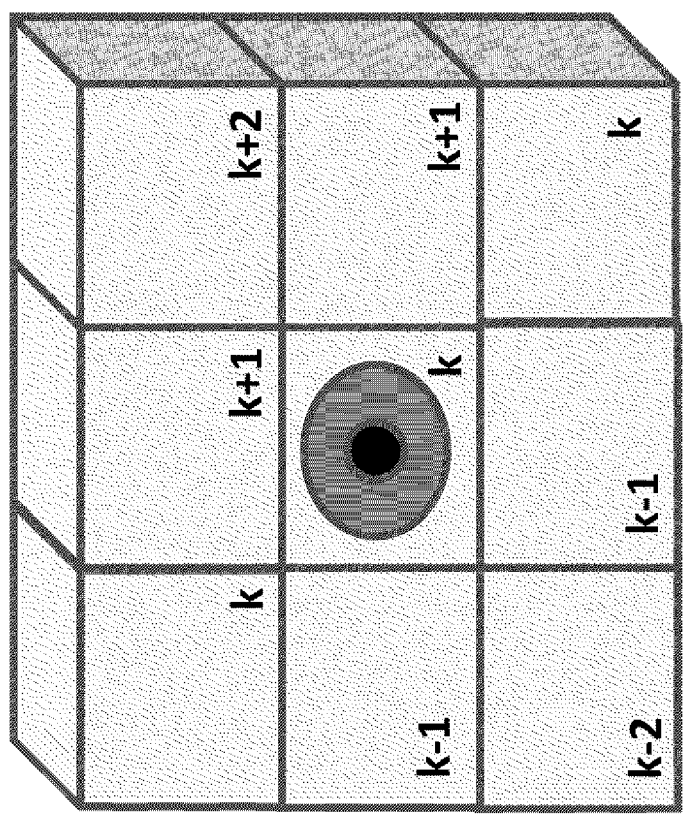
FIG. 5B depicts the teapot-in-a-stadium scene resolved in the present invention by efficient 'borrowing' mechanism. The only object falls in a "central" voxel belonging to module k, creating an extreme load imbalance.
Figure 5C:
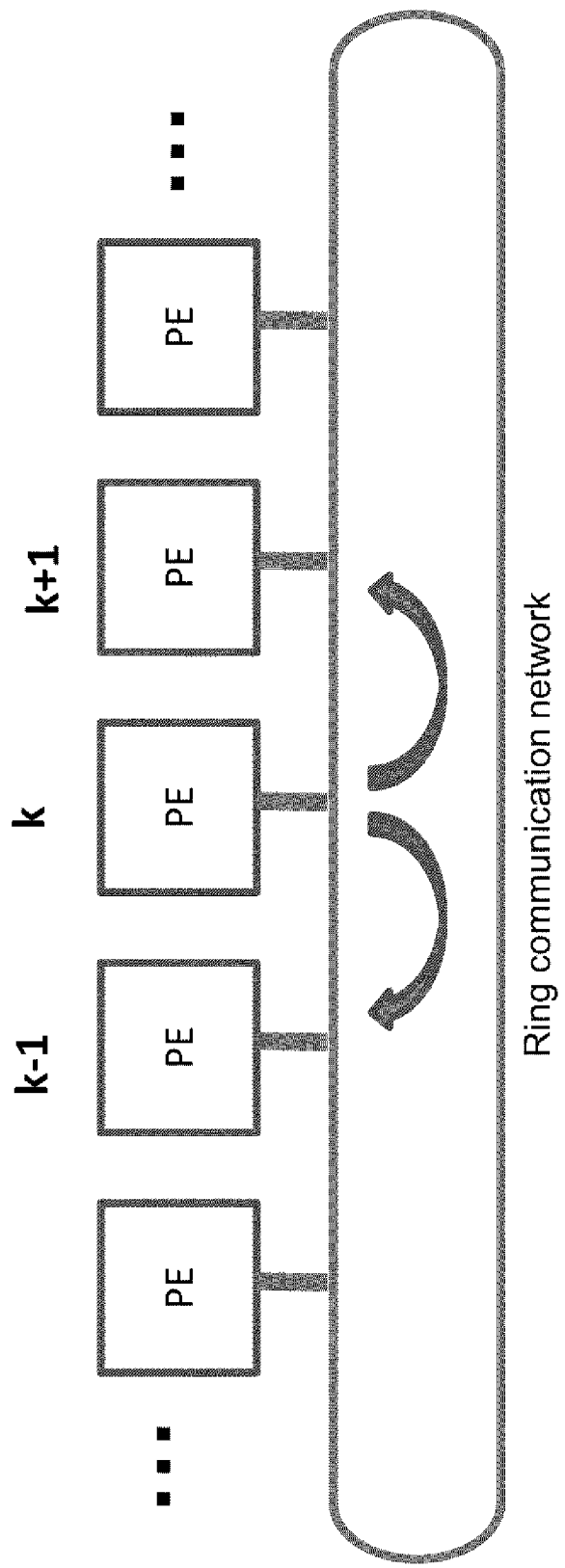
FIG. 5C depicts load balancing of the teapot-in-a-stadium scene by "borrowing" two adjacent processors in a distance of single hop across the ring communication.

FIG. 5B depicts the scene in present invention's MM data domain. For clearness, only the 2D section is shown. The only (teapot) object falls in a "central" voxel belonging to module k, creating an extreme load imbalance. The borrowing mechanism of present invention solves such imbalance by migrating parts of the voxel's load to neighboring processors, $PE_{k-1}$ and $PE_{k+1}$, offloading the central $PE_k$. Then the source data at voxel k must be shared with destination processors. Due to the Modular Mapping, the minimal geographical distance to surrounding voxels, correlates with the smallest physical distance between the memories of $PE_k$ with those of $PE_{k-1}$ and $PE_{k+1}$. This feature significantly lowers the cost of data moves in the case of borrowing. FIG. 5C shows the solution in processor domain. Processors k−1 and k+1 are "borrowed" to offload the central processor k. The relevant data residing at the $k_{th}$ PE's memory must be delivered to the borrowed processors. Due to MM scheme this data is transferred across the ring between adjacent processors. No global communication is required.

Figure 5D:
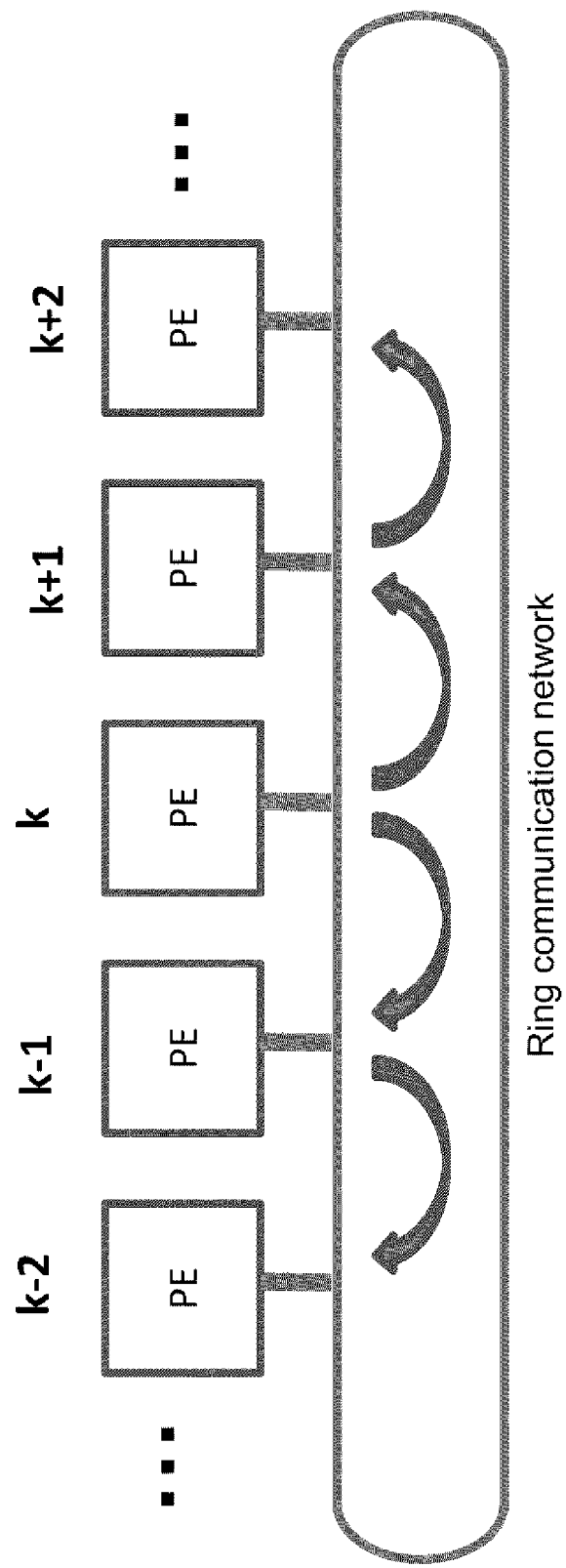
FIG. 5D depicts extended load balancing of the teapot-in-a-stadium scene by "borrowing" four processors in a distance of two hops across the ring communication.

An extended load balancing of the teapot-in-a-stadium scene can be done by mobilizing the second degree neighborhood as well. As shown in FIG. 5D, processors k−2, k−1, k+1 and k+2 are "borrowed" to offload the central processor k. The relevant data residing at the $k_{th}$ PE's memory is transferred by utmost 2 hops across the ring. No global communication is required as well.

Tracing a Ray

Figure 6:
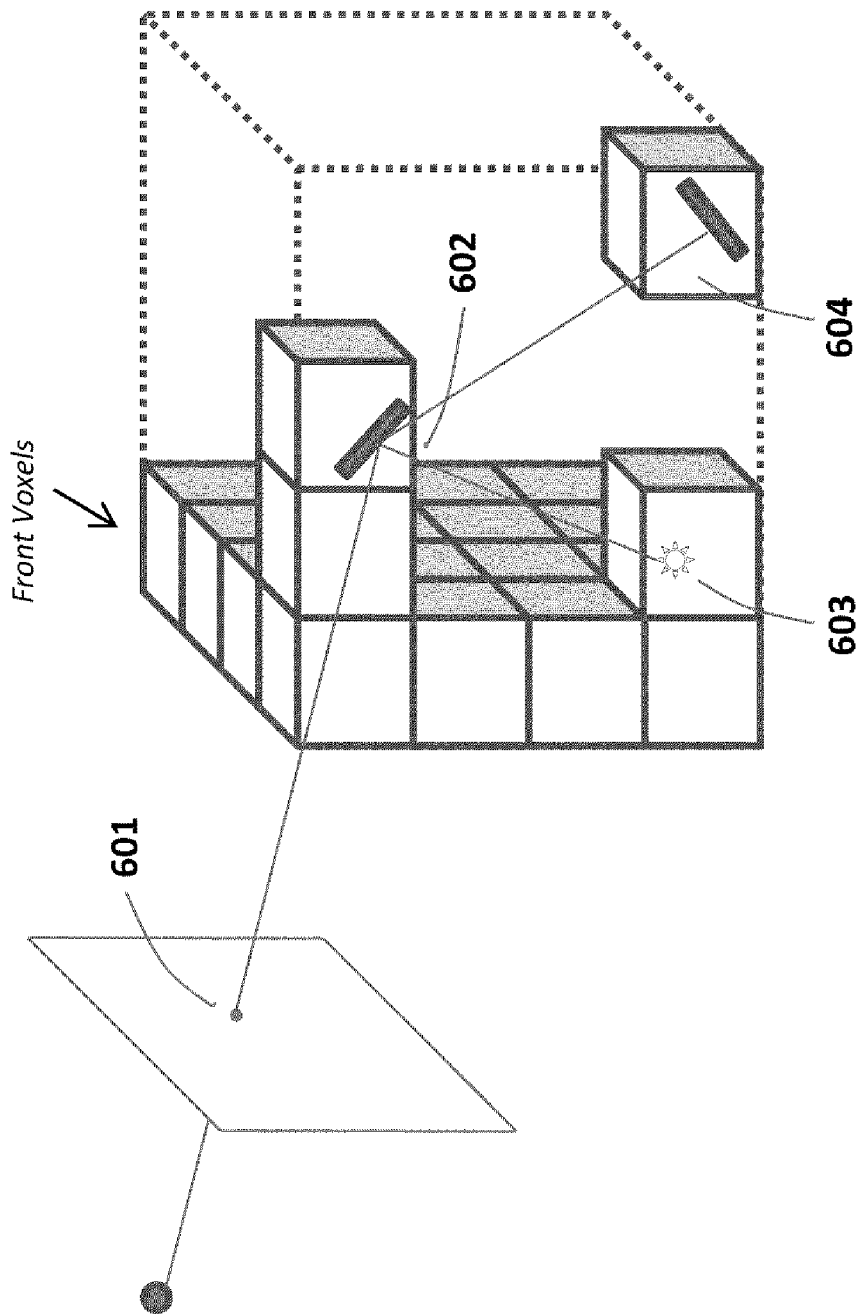
FIG. 6 shows a simple path of a traced ray within the uniform universe.

FIG. 6 shows a very basic example of tracing path from a particular point on the camera image plane (a pixel 601) into the scene, until it hits a surface at intersection point 602. The ray is created by PE at a front voxels (facing the screen) of its module. The ray progression is based on the incremental 3D DDA algorithm for line drawing on 3D raster grid. Each module keeps a list of its empty voxels. While tracing, the algorithm skips empty voxels by only examining the farthest intersection point of the ray with the next non-empty voxel. The intersection at each voxel is tested against the accelerating structure of local KD-tree. At intersection point a shadow ray is created toward the source of light 603, testing whether the hit point is shadowed by any occluding object, and the primary ray splits into reflective (secondary) ray that hits another object 605. Assuming that maximal recursion depth of a ray is limited to 2, the reflection ray terminates the trail. In its way back the secondary ray brings back light and texture values of its hit point 605, that are being summed-up at the voxel of intersection 602, and the final value is returned to the screen's pixel 601.

Figures 7A, 7B:
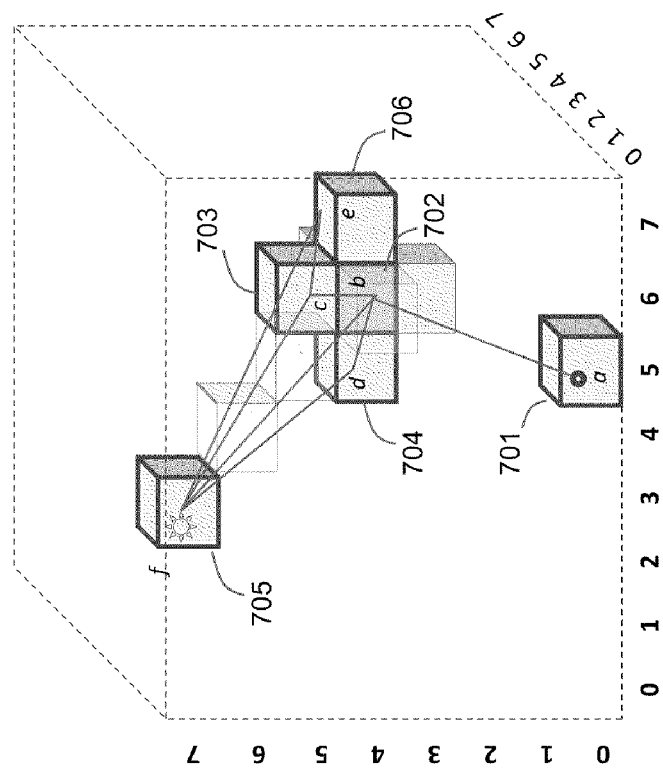
FIG. 7A illustrates a tracing example of family of rays.
FIG. 7B summarizes the relation between involved voxels and PEs in the tracing example.

In another example the dramatic cutback of inter-PE communication is demonstrated, an important aspect of present invention, by more elaborated case depicted in FIG. 7A. The scene is partitioned into regular grid of 8×8×8 voxels, controlled by parallel array of 8 PEs, 64 voxels per PE. A voxel is enumerated by its X, Y, Z coordinates, e.g. voxel 642 is positioned at X=6, Y=4, Z=2, and allocated to PE4 by its modular value. The path of the ray starts at a given pixel (a) 701, and intersects an object in voxel 642 (b) 702, where a generation of three additional rays is created: a shadow ray that is sent to light source (f) 705, reflection ray directed to (c) 703 in cube 652, and transmission ray (d) 704 reaching cube 542. A farther generation is shown when the ray of 672 is reflected to cube 742 (e) 706. Additionally, from each point of intersection a shadow ray is sent to light source (f) 705. The table of FIG. 7B summarizes the relations between involved voxels and PEs. The consequent inter-PEs communication while tracing the ray family is shown in FIG. 7C. The entire data transfer is limited to PE4 and its two neighbors, PE3 and PE5. Another data transfer, between voxels 652 and 742 (c to e), needs no communication, since both voxels are allocated to the same processor PE4.

The above example shades light on the way of cutting the inter-processor communication in data-parallel ray tracing system. Due to the Modular Mapping of present invention, most of data exchange occurs between neighboring PEs. Because of the high importance of neighbor-wise communication, a preferred embodiment of shared cache access between adjacent processors is invented, for higher efficiency and improved performance. This embodiment will be readily understood.

Ray and Scene Data Structures

The following detailed description of the ray and data structures, as represented in the figures herein, is not intended to limit the scope of the invention, as claimed, but is merely representative of embodiments of the invention.

In the present invention, taking the data-parallel approach of ray tracing, the object data is distributed over the memories, gaining high locality when each processor owns only a subset of the database and traces rays only when they pass through its own subspace. Three main criteria need to be observed for such distributions to lead to efficient execution of the parallel algorithm:

Communication requirements during rendering need to be minimized

The memory overhead for each processor should be as equal as possible

Processing time for each processor needs to be equalized

Communication requirements are minimized by high data locality excluding massive moves of data, moreover, the Modular Mapping of present invention transforms the massive and global communication needed for balancing the load, into neighbor-wise regularly patterned communication.

The amount of scene memory varies among processors because of the schematic data distribution, without trying to equally distribute the scene objects. However, locality of scene data minimizes its moves. Moreover, the use of cache-memories in present invention is intended to nullify cache misses and memory fetches during voxel processing, once voxel data has been downloaded from memory to cache. All these keep the memory overhead low and fairly equal. The other data in the system is that of rays, it is non-massive and moves among processors in neighbor-wise fashion, accommodated by shared-cache transfers of preferred embodiment, or by single ring hop for commodity based embodiment, still minimizing memory overhead. The exception is when empty voxels must be skipped, and then ray maybe transferred between non-adjacent processors.

Equalization of processing time in cases of global clustering is addressed by the "borrowing" mechanism, as described hereinabove. The data associated with borrowing is delivered by massive data transfers among adjacent PEs, by means of shared-cache transfers of preferred embodiment, or by single ring hop for commodity based embodiment.

The scene and ray data are structured to address the above three criteria. Processor's subspace consists of the entirety of module's voxels, while the PE is competent of processing only one voxel at a time (or few more by applying multi-threading). Therefore a voxel can be in an active state, handled by processor, or inactive state, waiting for its turn, and a mechanism is needed to keep all the inactive voxels receiving rays from all over in real time. This and other special needs of present invention data handling are accomplished by differentiating between the duties of processor's memory and its cache. FIG. 8A-B depict the data structures of both. As shown in FIG. 8A, the processor's memory holds scene 812 and ray data 813 for all non-empty voxels of the module, and list of empty voxels 811. There are N voxels per module, while M of them are non-empty. Voxel's local scene 812 is KD-tree structured for intersections acceleration. The cache-memory in FIG. 8B holds the entire data set of the active voxel k 822. In addition, the cache stores input buffers of all processor's voxels 824, enabling a continuous ray reception mode in real time for all inactive voxels (excluding the empty voxels). The received rays will be taken care of when the voxel turns active. Another important partition in cache is Transfer-buffer 821 to accommodate communicating the data between processor and its nearest neighbor.

A ray life cycle has two distinct phases: (i) building the ray family and associated nodes, and (ii) folding back the ray structure while aggregating the light value toward the final screen pixel. The build phase includes ray commencement at a screen's pixel, seeking intersection with object, constructing a node, and generating children rays of shadow, transmission and reflection. At this phase rays do not carry any light values. The second phase of back folding starts upon termination of rays, due to depth limitation or space limitation. All the family rays are returned back to their source nodes carrying light value which is summed up with other rays in the node. A node is being removed from Node list, right after all children have been aggregated into parent ray. The parent, in turn, is sent back to its source node, etc., until the entire family's light value finalizes at the screen pixel.

FIG. 8C details the structure of ray data for each non-empty voxel. The data associated with life cycle of a ray is divided to static and dynamic elements. Static data resides in memory: Input-buffer (incoming rays), Output buffer (outgoing rays), Termination buffer (terminating rays), and Node Record defining the intersection point. The dynamic Ray Record, defining ray attributes, source and destination, is being conveyed among the voxels. Each of the classes is farther break down and explained in FIG. 8C. Their exact functions will become clear in the hereinafter example.

Figure 9A:
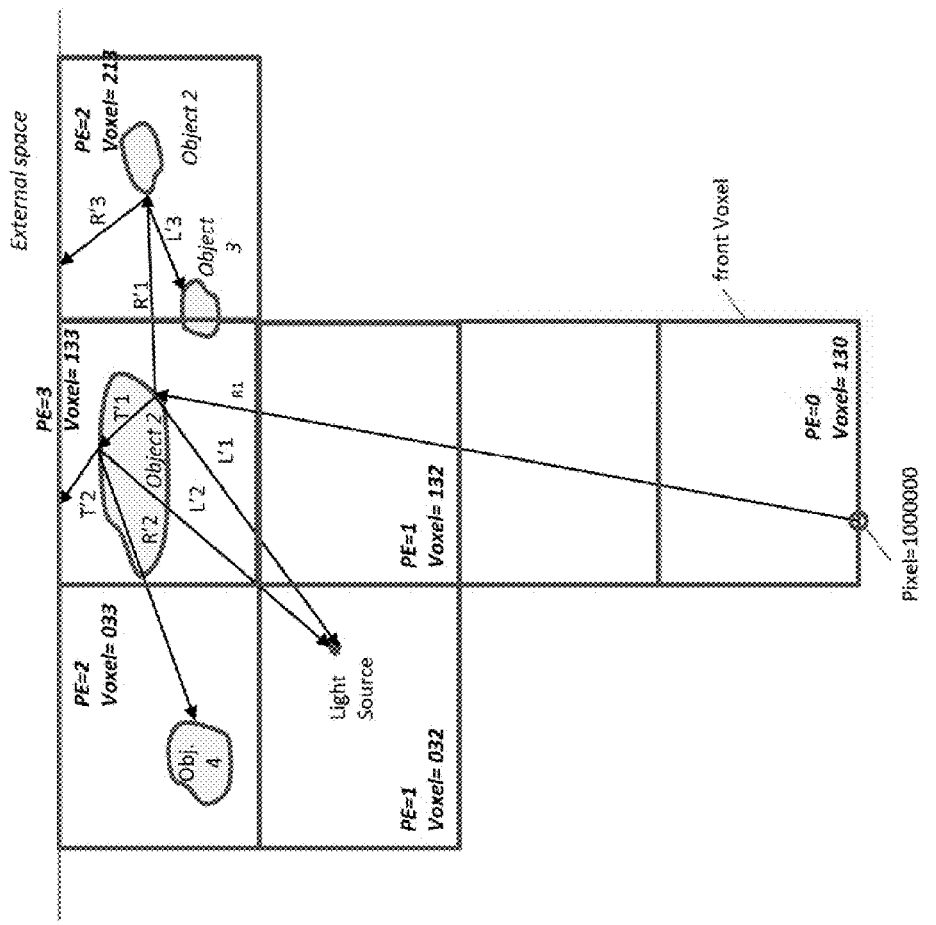
FIG. 9A depicts an elaborated example of ray tracing in the modularly mapped scene.
Figure 9B:
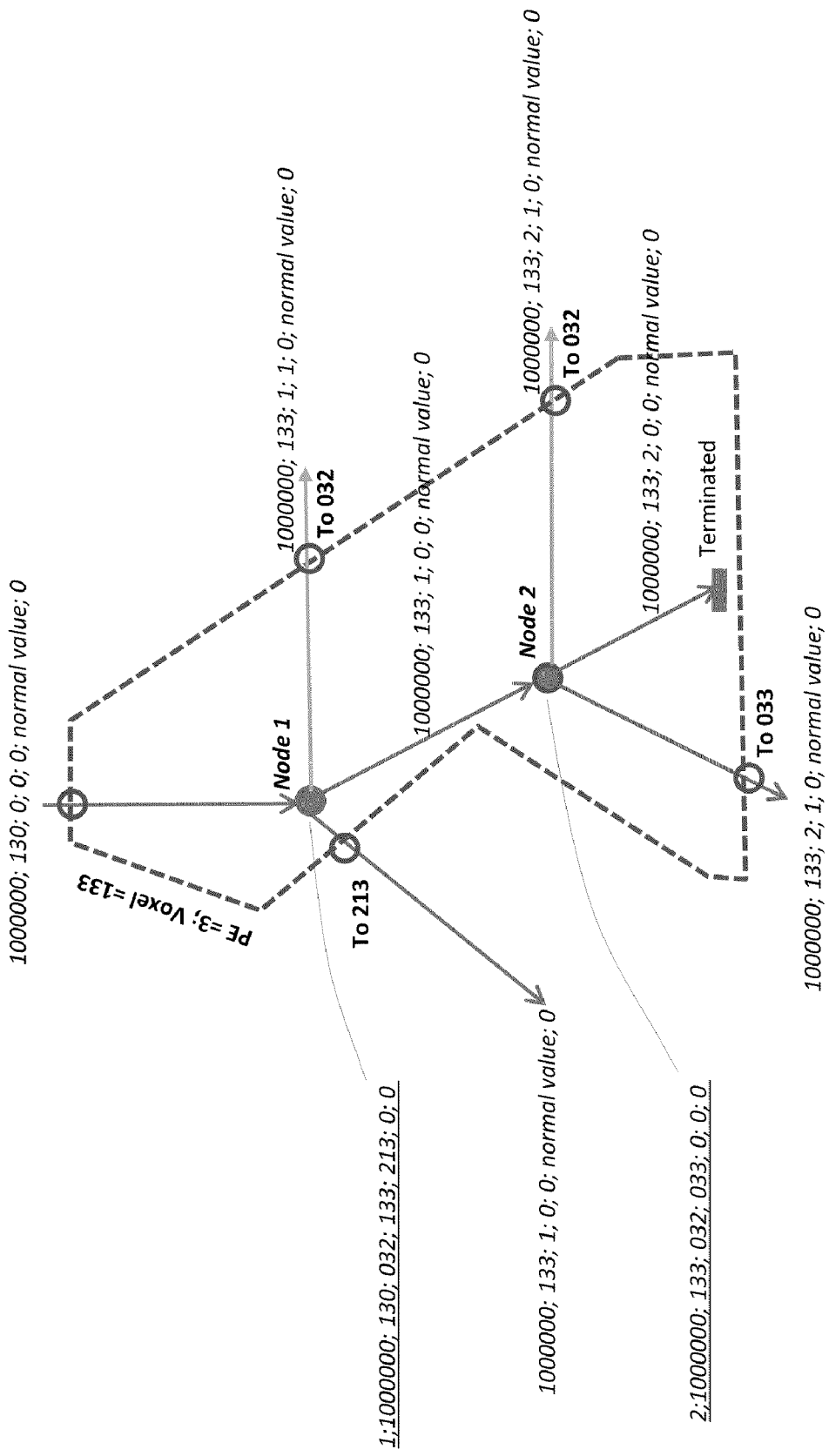
FIG. 9B depicts detailed ray tracing process at specific PE and specific voxel, of the elaborated example.

The static data comprises:
Input-Buffer
Incoming rays
Local rays (created in course of local processing)
Folding rays (incoming ray on its way back)
Output-buffer
immediate send (to be sent to target voxel)
Return to source (to be returned to the voxel it came from)
Termination Buffer
Parent rays (waiting for aggregation in Folding cycle)
Terminated rays (waiting for aggregation in Folding cycle)
Node record
local node ID;
Pxl_ID;
Topology [parent (source_voxel_ID), shadow (target_voxel_ID), out_ray1 (target_voxel); out_ray2 (target_voxel];
Status: (build(0)/fold(1);
Light value
The dynamic data comprises:
Ray record:
Pxl_ID;
Source (voxel; node);
Ray class: regular(0)/shadow(1);
Status: Build(0)/Fold(1);
Ray's normal
Light value
The understanding of detailed structure of the Ray and Node records is required for the elaborated example hereinafter:
Ray Record
Pixel ID; source voxel; source node (0=pixel, any number=node); regular (0) or shadow (1) ray; build (0) or fold (1) state; ray's normal; light value
Node Record:
Local node ID; Pixel ID; father (source voxel); shadow (target voxel or terminate(0)); child1 (target voxel); child2 (target voxel or terminate(0)); state (build, fold); light value Detailed example of the ray handling mechanism is described in FIGS. 9A-9C. FIG. 9A shows the course of primary ray, secondary rays and shadow rays. This is a simplified test case where the space is partitioned into 4×4×4 voxels, processed by parallel array of 4 PEs, 16 voxels per PE. The exemplified voxel is 133, processed by PE=3. The voxel receives ray R1 which during the Build phase intersects with object 1, splits into three children: reflected ray R'1 which leaves the voxel; transmitted ray T'1 which encounters another intersection inside the voxel; and shadow ray L'1 which leaves the voxel for the light source. The first point of intersection creates node 1. Second node within the voxel is created where T'1 hits object 1 and splits into: R'2 that leaves the voxel to adjacent one; T'2 that escapes out of the scene space; and shadow ray L'2 which leaves toward light source.

The Folding phase occurs when rays start returning along with light values, which are summed up at the nodes. R'2, T'2 and L'2 aggregate into T1 and node 2 is been removed from records. T'1, R'1 and L'1 aggregate into R1 which is sent back to the pixel, and finally node 1 is removed.

Now let's repeat step by step on the above scenario, the way it is performed by PE=3. First the Build phase.

1. In some prior time, when voxel 133 where inactive, arrives in Received Rays queue a ray having the following record: 1000000; 130; 0; 0; 0; normal value; 0. Ray's ID is 1000000, named after the source pixel; the source voxel is 130; It comes directly from the pixel rather than from some node; It is a regular ray (not a shadow); build phase; Its direction given by normal value; light value is null. The ray waits in the queue for the voxel to become active.
2. When the voxel becomes active, its specific data is downloaded from memory into PE's cache: (i) Voxel_133 KD-tree, (ii) static ray data comprising buffers and node list.
3. Node 1. The ray is taken from the queue for intersection test against the Voxel_133 KD-tree. Intersection is found and registered in a newly created Node 1: 1; 1000000; 130; 032; 133; 213; 0; 0. The ray is stored in Termination Buffer as Parent ray, waiting for Folding phase.
4. Node 1. Reflection ray is created and tested for possible intersection with Voxel_133 KD-tree. Since internal intersection was not found, another voxel on ray's way is pierced by 3D DDA. The ray record is assembled: 1000000; 133; 1; 0; 0; normal value; 0, and sent to target voxel 213.
5. Node 1. Transmission ray is created and tested for possible intersection with Voxel_133 KD-tree. Intersection is found and registered in a newly created Node 2: 2; 1000000; 133; 032; 033; 0; 0; 0. The ray is stored in Termination Buffer as Father ray, waiting for Folding phase.
6. Node 1. Shadow ray is created; its direction toward light source is calculated, and tested for possible intersection with Voxel_133 KD-tree. Once internal intersection was not found, another voxel on ray's way is pierced by 3D DDA. The ray record is assembled: 1000000; 133; 1; 1; 0; normal value; 0, and sent to target voxel 032.
7. Node 2. Reflection ray is created and tested for possible intersection with Voxel_133 KD-tree. Once internal intersection was not found, another voxel on ray's way is pierced by 3D DDA. The ray record is assembled: 1000000; 133; 2; 1; 0; normal value; 0, and sent to target voxel 033.
8. Node 2. Transmission ray is created and tested for possible intersection with Voxel_133 KD-tree. Since internal intersection was not found, then 3D DDA founds out that the ray leaves the scene. Therefore it is given a background light value (or texture) and stored in Terminated Ray as: 1000000; 133; 2; 0; 0; normal value; 0. Now it is ready to Folding phase, to be summed up into its parent ray at Node 2.
9. Node 2. Shadow ray is created, its direction toward light source calculated, and tested for possible intersection with Voxel_133 KD-tree. Once internal intersection was not found, another voxel on ray's way is pierced by 3D DDA. The ray record is then assembled: 1000000; 133; 2; 1; 0; normal value; 0, and sent to target voxel 032.

Figure 9C:
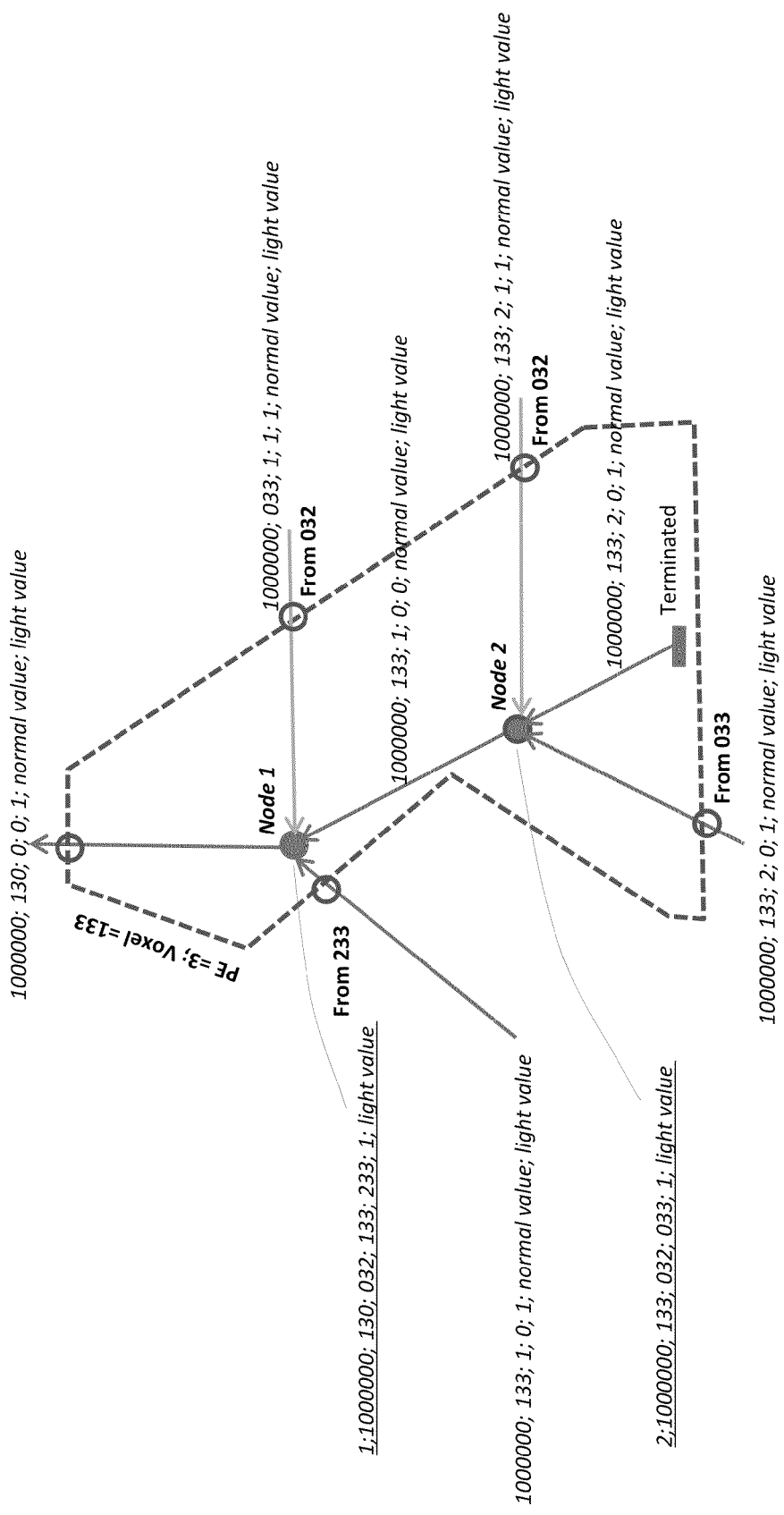
FIG. 9C shows the folding stage of the exemplary rays, when the light values are aggregated.

The Folding phase is shown in FIG. 9C.

1. There are rays waiting for folding when the voxel becomes active again: (i) in voxel's Input-Buffer, which permanently resides in PEs cache and continuously receives returning rays from previously target voxels, (ii) Parent rays in Termination Buffer.
2. Node 2. The returning ray 1000000; 133; 2; 0; 1; normal value; light value is summed up with the locally terminated ray 1000000; 133; 2; 0; 0; normal value; 0. The intermediate result is stored in Node 2. Upon arrival of the shadow ray 1000000; 133; 2; 1; 1; normal value; light value the aggregation is completed and stored in the Light field of the parent ray 1000000; 133; 1; 0; 0; normal value; light value. The parent is stored in Input Buffer for next folding cycle, and Node 2 is removed from the list.
3. Node 1. Upon arrival of the rays 1000000; 133; 1; 0; 1; normal value; light value and 1000000; 033; 1; 1; 1; normal value; light value, they are aggregated along with the awaiting ray 1000000; 133; 1; 0; 0; normal value; light value, into parent ray 1000000; 130; 0; 0; 1; normal value; light value and sent back to voxel 130. The record of Node 1 is removed from the list.

Data Locality

Assuming that the partition of universe was properly designed, such that the cache size is adequate for all voxel's data, then during the voxel activity period all its associated data resides in the cache: KD-tree, all its buffers and rays. This data entirely describes everything occurring in the voxel, no additional data from external memory is needed. This locality of data eliminates cache misses during voxel's processing time. The only cache miss is associated with exchanging the data for the next voxel. This can be eventually avoided if the cache is big enough to preload the successive data.

Flowchart

Figure 10A:
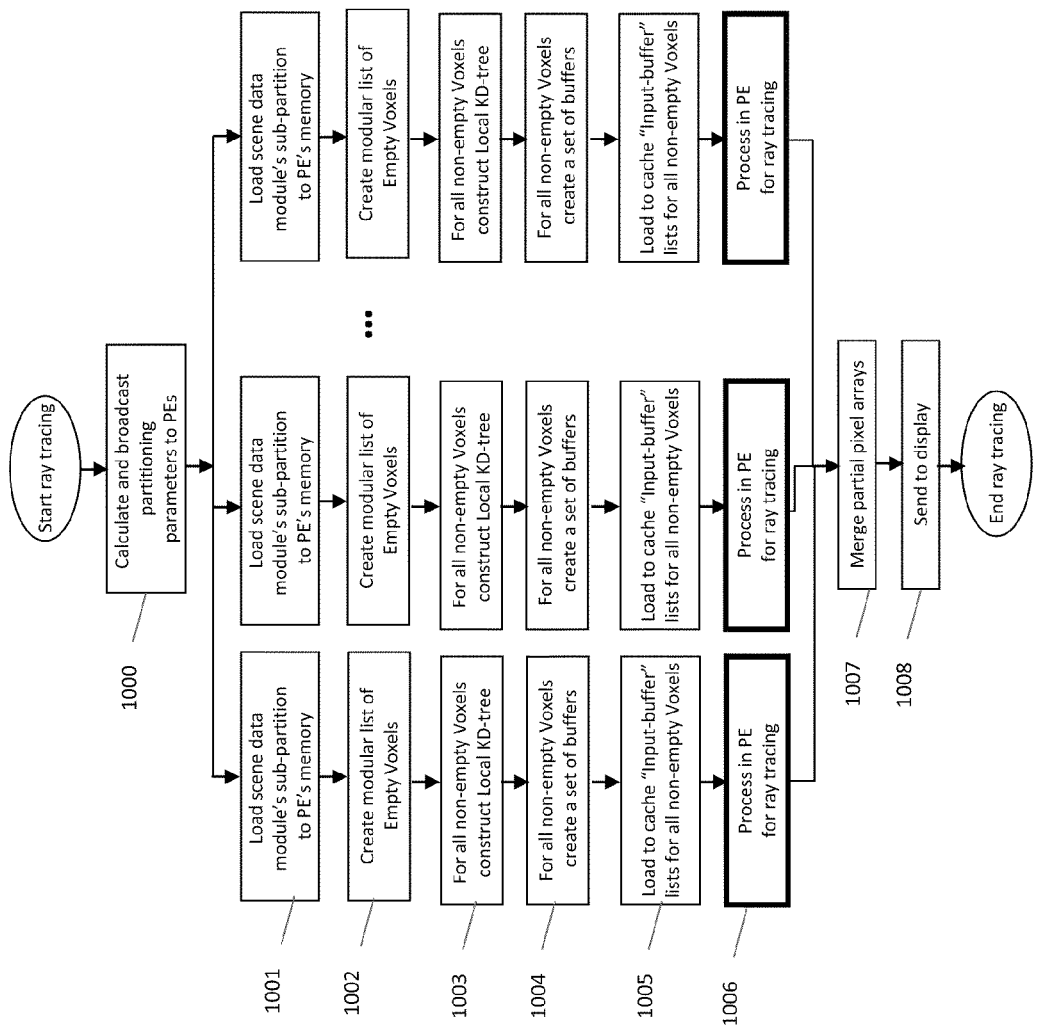
FIG. 10A depicts a high level flowchart of ray tracing process of present invention.

Flowchart of FIG. 10A describes the high level ray tracing process of present invention. A parallel array of any N number of PEs is assumed, while one of the PEs monitors the process at high level. It can be just one of the processors (e.g. PE=0), performing an extra task 1100 of calculating and broadcasting partitioning parameters to PEs, and merging the partial results of the PEs 1107-1108.

At first step of initialization phase, upon receiving the portioning parameters, each PE downloads its sub-partitioned scene data from central storage to PE's memory 1101. The data is analyzed to find the empty voxels 1102 and to construct a KD-tree for the non-empty voxels 1103. Then a set of buffers is initialized for every (non-empty) voxel in PE's memory 1104. The Input buffers of all voxels are copied to cache memory, for staying all the time in reception mode 1105. Then each processor starts the ray tracing phase 1106 (this stage is farther detailed in FIG. 10B).

Upon finalizing all partial pixel images at PEs, the monitoring PE merges them into final image 1107, and sends the image to display 1108.

Figure 10B:
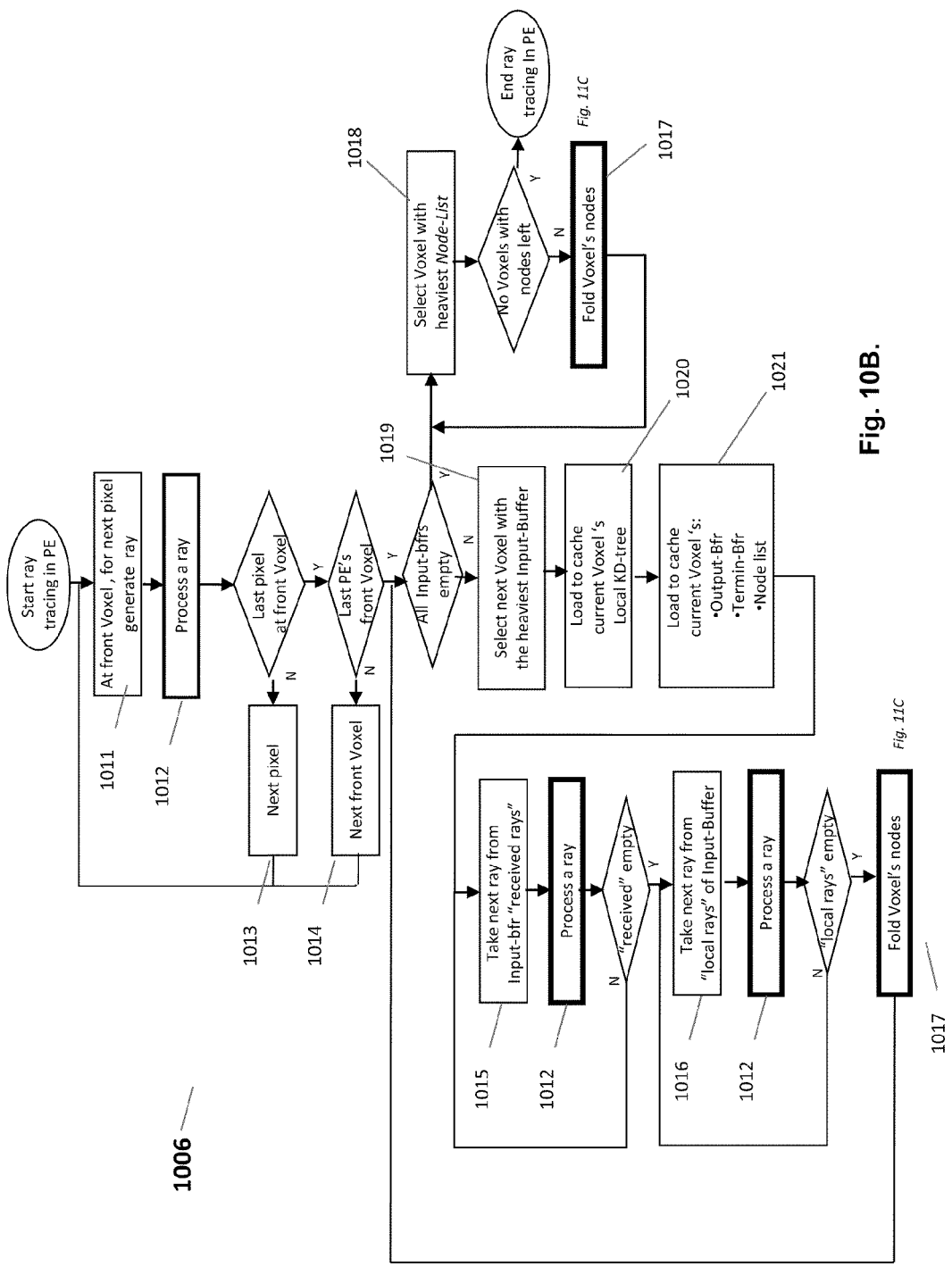
FIG. 10B depicts a flowchart of ray tracing process in a PE.

The flowchart of FIG. 10B describes the ray tracing at each PE. First all the front voxels, facing the screen image, are processed for generating rays. It is possible to process a bundle of rays, relying on their coherence. However, in the herein described ray tracing processes only a single ray is taken at a time, to simplify the principal description. A ray, after being generated 1011, starts the tracing process in the current front voxel. This ray processing task 1012 is described elsewhere (FIG. 10C) in depth. If intersection was met in the front voxel, then it was registered in 'local rays' of Input buffer for later processing. After all rays are generated pixels of current front voxel 1013, and all front voxels are exhausted 1014, the most loaded voxel is chosen for processing 1019. This voxel data KD-tree structured and ray structure are loaded to PE's cache 1020-1021, and next ray in the 'Input List' ('received') 1015 is taken for processing 1012. After all these rays are done, the locally generated rays in 'Input Buffer' ('local') 1016 are processed. When this is done, all the nodes waiting in 'Termination Buffer' of the current voxel are being folded 1017. Upon terminating the voxel, next heaviest voxel is chosen, 1019 etc. When all "input Buffers' of all voxels are done, the folding cycle 1018 terminates the tracing.

Figure 10C:
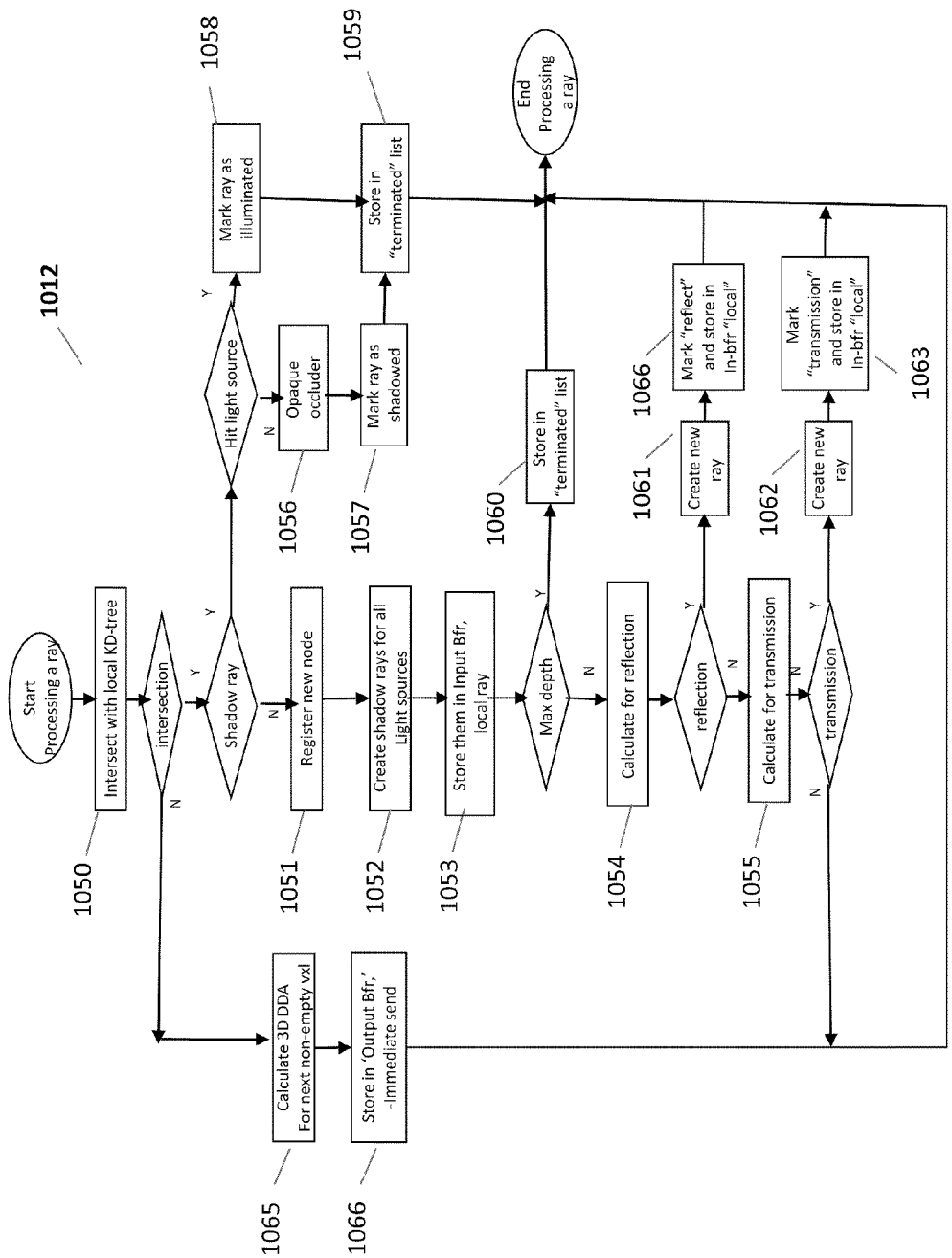
FIG. 10C depicts a flowchart of the folding stage of ray tracing process.

The detailed flowchart of ray processing is depicted in FIG. 10C. It starts by ray intersection with local KD-tree 1050. If no intersection detected, next voxel along the ray is calculated 1065 by means of 3D DDA, and stored in 'Output Buffer' ('Immediate send'). If intersection has been detected, and the intersecting ray is not a shadow ray, a new node is registered 1051, then shadow rays are created and stored 1052-1053, and the secondary rays of reflection 1054 and refraction 1055 are calculated and stored for later processing. In case it is a shadow ray, a proper handling is done 1056-1059.

Figure 10D:
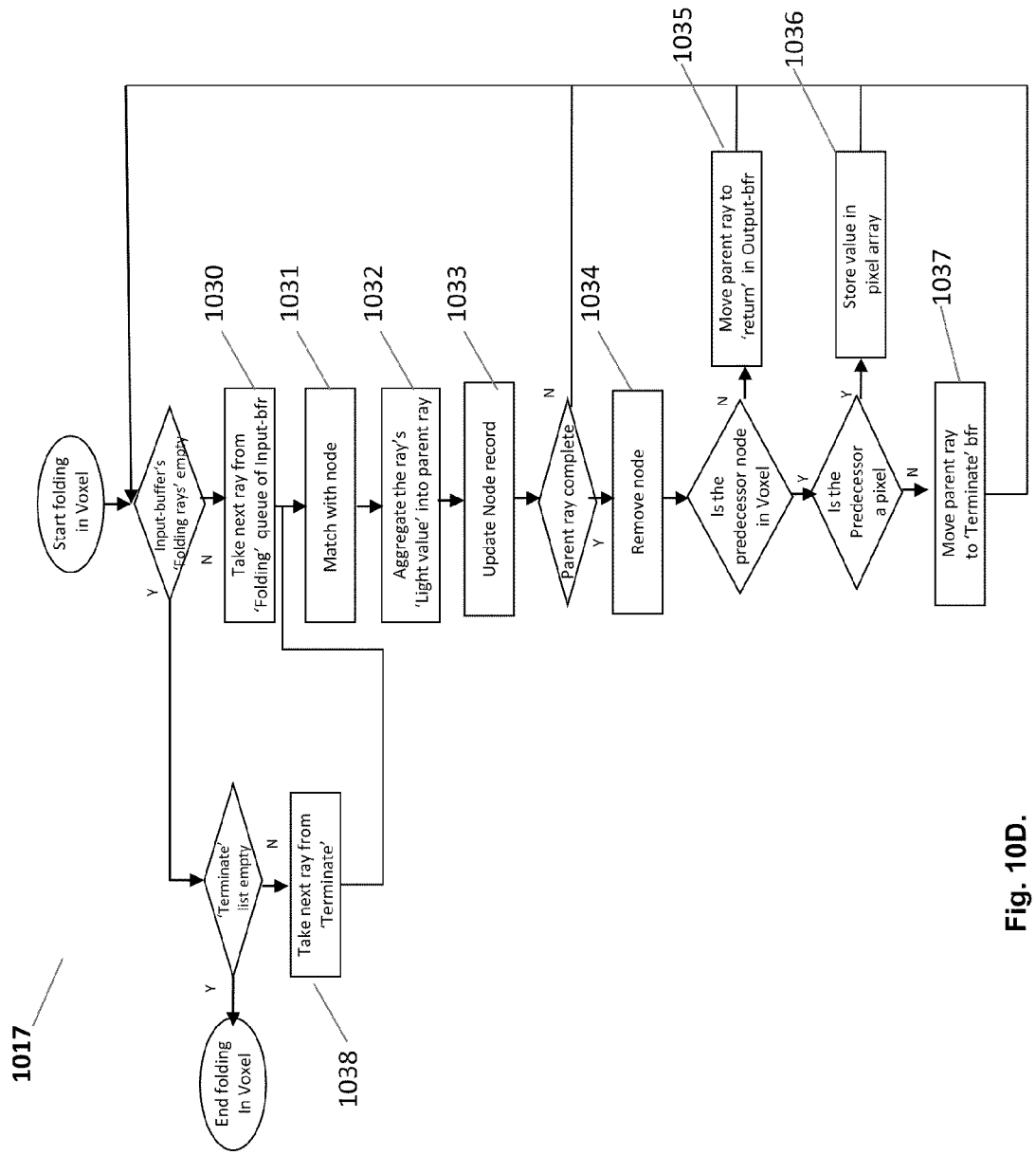
FIG. 10D depicts a flowchart of processing a ray.

The folding cycle is described in FIG. 10D. The next ray from 'folding' queue is taken, matched with a node 1031, light value aggregated 1032, and nodes are folded back 1034 until the pixel of origin is reached 1036.

Implementation

PREFERRED EMBODIMENT OF PRESENT INVENTION

In the present invention, by taking the data-parallel approach of parallel ray tracing the inter-processor communication is highly reduced. Due to the Modular Mapping there is no massive global communication, and most of the data exchange occurs between neighboring PEs. Because of the high importance of neighbor-wise communication, the preferred embodiment comprises shared memory access between adjacent processors, replacing wired communication, for higher efficiency and improved performance. The preferred embodiment, depicted in FIG. 11A, is a distributed memory parallel ray tracing system, where the scene data is distributed over the memories. There are some N processors, each processor 1101 includes CPU, cache and I/O, and is connected to private memory 1102. All processors are connected via ring 1105. In some cases the ring can be replaced by different topology, e.g. router, however this will deteriorate the efficiency and cost/performance. The neighbor-wise communication, which happens to be the most significant communication in present invention, is implemented by shared-memory means, via caches. Each processor 1101 is connected to one neighbor by its own cache 1103 and by direct connection to the second neighbor's cache 1104. All processors are having access to central storage 1106 via ring. The massive data moves, such as for inter-processor load-balancing ("borrowing"), and majority of ray data moving between neighboring voxels, are accomplished via cache-based communication. Another ray communication, much less frequent, such as skipping over empty voxels, is done via ring.

Another preferred embodiment, depicted in FIG. 11B, is a shared memory parallel ray tracing system, with no private memories. This kind of system is implementable by SOC (system on chip) technology (termed also 'multicore'), where the entire system resides in a single chip, and silicon constraints exclude constructing private memories on chip. The central memory 1110 is external to the SOC.

Implementation on Commercial Multicore Architectures

The efficient algorithm of present invention is capable of implementation on many commercial parallel systems, which offer advantages of lower cost and mature programming environment, such as many-core architecture of Larrabee by Intel, Cell by IBM, and others. In this class of architectures each core PE has its own cache memory element, and the multiple processing cores are connected via ring bus. Each PE entirely depends on the ring to transfer data to and from the other caches. In these transfers the number of steps involved in sending the packet has typically very little impact on transfer latency: the clock speed driving the steps is very fast relative to other considerations. However, longer communication distances are detrimental to the overall performance of the ring bus as they reduce available concurrency. Such a reduced concurrency is an inhibiting factor for prior art's space division ray-tracing. As opposed to it, the modular space division of present invention is an enabler to space division ray-tracing by replacing the majority of long communication distances, or global communication, by short data exchanges between neighboring PEs, drastically rising the concurrency of ring communication.

Larrabee by Intel is an example of many-core architecture with coherent caching, designed around fast ring connecting X86 based CPUs with local caches, as shown in block diagram of FIG. 12. Due to coherency, all local caches can be seen as one global 2nd level (L2) cache, divided into separate local subsets, one per CPU core. Each CPU has a fast direct access path to its own local subset of the L2 cache. Data read by a CPU core is stored in its L2 cache subset and can be accessed quickly, in parallel with other CPUs accessing their own local L2 cache subsets. Data written by a CPU core is stored in its own L2 cache subset and is flushed to other subsets, if necessary. The ring network ensures coherency for shared data.

Implementation of the present invention's method on Larrabee is done by dividing the scene space among the core CPUs, each CPU controlling N2 voxels. The monitoring is done either by one of the cores functioning as privileged CPU, or by an external CPU. Local cache holds the voxel's data of all assigned voxels, in a turn. Moving ray record to other CPUs is done by writing to its local L2 cache subset via ring bus. Data flows stepwise around the ring. Data exchange between two physically neighboring CPUs can be done concurrently with any other pair of CPUs. However, longer communication distances are harmful to the overall performance of the ring as they reduce available concurrency. Therefore it is of great advantage to reduce the communication to short neighboring segments along the ring, by applying the modular mapping of present invention. The four arrows in FIG. 12 indicate the communication of the example in FIG. 9A, implemented on Larrabee.

Another commercial multi-core architecture is Cell by IBM (see FIG. 13). Each Cell consists of a PowerPC core (PPE) and eight "synergetic co-processor elements" (SPEs). Each SPE has 256 KB local store, which is incoherent with the rest of the memory system, a memory flow controller (MFC) and synergetic processing unit (SPU). The EIB bus is responsible of transferring data between SPEs. It is implemented as a circular ring comprising four unidirectional channels which counter-rotate in pairs. Each SPE has one read port and one write port, and a dedicated DMA management queue capable of transactions to various endpoints without interfering with the ongoing computations. Each SPE depends on DMA to transfer data to and from the main memory and other SPE's local memories. Data flows on an EIB channel stepwise around the ring.

Implementation of present invention on Cell is rather straightforward, e.g. the PPE monitors the entire process while the scene space is partitioned among and controlled by the SPEs. Local stores hold the data associated with voxels. Each SPE has access to local stores of other SPEs via EIB bus.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A system for data parallel ray tracing, comprising: at least three processors interconnected by ring topology for inter-processor communication;
   3D modules of data comprising equal size voxels, each voxel is a cube with six faces, each voxel contains data, each adjacent voxel is attached to one of the faces of the voxel cube;
   said processors receiving 3D ray tracing data from a set of said modules, wherein said modules are mapped onto said processors, such that every two adjacent voxels can communicate within two neighboring processors.

2. The system of claim 1, wherein two adjacent voxels can communicate within two neighboring processors by means of the closest distance on said ring communication.

3. The system of claim 1, wherein for any voxel in the uniform grid of voxels, all 6-connected neighboring voxels to said voxel are in communication distance of a single hop on the ring.

4. The system of claim 1, wherein all data modules have the same number of voxels.

5. The system of claim 1, wherein the modular mapping is applied on data parallel ray tracing.

6. The system of claim 1, wherein the data mapping is rebuilding every frame to supporting for interactive ray tracing.

7. The system of claim 1, wherein a model is composed of millions of triangles.

8. The system of claim 7, wherein interactive rates are more than ten frames per second.

9. The system of claim 4, wherein the shortest distance between voxels matches the shortest inter-processor communication distance.

10. The system of claim 9, wherein the mapping of module's cells to processors is of skewed alignment, having multiple voxels per processor uniformly scattered across the scene.

11. The system of claim 1, wherein the module can be mapped to more than one processor.

12. The system of claim 1, wherein more than one module can be mapped to a processor.

13. The system of claim 10, wherein only commodity processors are in use.

14. The system of claim 10, wherein a spatial scattering of module's cells assists in intra-modular load balancing.

15. The system of claim 10, wherein the said skewed data structure enhances the locality of data-parallel approach.

16. The system of claim 1, wherein for large scenes the data is distributed among distributed memories.

17. The system of claim 1, wherein for a small scene data an entire data is stored in a shared memory parallel processing system.

18. The system of claim 17, wherein the system is implemented on a multi-core chip.

19. The system of claim 10, wherein due to the modular mapping there is no massive global communication, and most of the data exchange occurs between neighboring processors.

* * * * *